(12) United States Patent
Katsumata et al.

(10) Patent No.: US 10,597,021 B2
(45) Date of Patent: Mar. 24, 2020

(54) CONTROL APPARATUS FOR HYBRID VEHICLE

(71) Applicants: Toyota Jidosha Kabushiki Kaisha, Toyota-shi (JP); Aisin AW Co., Ltd., Anjo-shi (JP)

(72) Inventors: Munehiro Katsumata, Toyota (JP); Hiromichi Kimura, Okazaki (JP); Kazuyuki Shiiba, Miyoshi (JP); Tooru Matsubara, Toyota (JP); Takeshi Kitahata, Miyoshi (JP); Kenta Kumazaki, Anjo (JP); Nobufusa Kobayashi, Anjo (JP); Masato Yoshikawa, Toyota (JP); Takahiro Kimura, Tajimi (JP); Daisuke Suyama, Anjo (JP); Kazuomi Okasaka, Anjo (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 77 days.

(21) Appl. No.: 15/846,862

(22) Filed: Dec. 19, 2017

(65) Prior Publication Data
US 2018/0170345 A1 Jun. 21, 2018

(30) Foreign Application Priority Data
Dec. 19, 2016 (JP) .................................. 2016-245977

(51) Int. Cl.
*B60W 20/10* (2016.01)
*B60W 30/188* (2012.01)
(Continued)

(52) U.S. Cl.
CPC ............. *B60W 20/10* (2013.01); *B60K 6/365* (2013.01); *B60K 6/383* (2013.01); *B60K 6/387* (2013.01);
(Continued)

(58) Field of Classification Search
CPC ...... B60W 20/10; B60W 10/06; B60W 10/08; B60W 2510/0638; B60W 2710/0666; B60K 6/445; B60K 6/365
See application file for complete search history.

(56) References Cited

U.S. PATENT DOCUMENTS

| | | | | |
|---|---|---|---|---|
| 2012/0265427 A1* | 10/2012 | Petridis | ................. | B60W 10/02 701/113 |
| 2014/0343775 A1* | 11/2014 | Yamamoto | ............. | B60K 6/365 701/22 |

(Continued)

FOREIGN PATENT DOCUMENTS

| JP | 2012-240441 A | 12/2012 |
|---|---|---|
| JP | 2014-223888 | 12/2014 |

*Primary Examiner* — Stacey A Fluhart
(74) *Attorney, Agent, or Firm* — Oblon, McClelland, Maier & Neustadt, L.L.P.

(57) ABSTRACT

A control apparatus for a vehicle includes a control portion configured to control an input torque to an automatic transmission such that a value representing a rotating state of an input rotary member of the automatic transmission coincides with a target value; a racing determining portion configured to determine whether a rotating speed of an engine is predicted to exceed a predetermined rotating speed when control is provided such that the value representing the rotating state of the input rotary member of the automatic transmission coincides with the target value during a power-on shift-down action of the automatic transmission; and an output limiting portion configured to limit the output torque of the engine to a predetermined torque or less if the rotating speed of the engine is predicted to exceed the predetermined (Continued)

rotating speed during the power-on shift-down action of the automatic transmission.

20 Claims, 9 Drawing Sheets

(51) Int. Cl.
*B60W 20/30* (2016.01)
*B60W 10/115* (2012.01)
*B60K 6/547* (2007.10)
*B60K 6/383* (2007.10)
*B60W 30/19* (2012.01)
*B60K 6/387* (2007.10)
*B60W 10/26* (2006.01)
*B60K 6/365* (2007.10)
*B60K 6/445* (2007.10)
*B60W 10/06* (2006.01)
*B60W 10/08* (2006.01)
*B60K 6/38* (2007.10)

(52) U.S. Cl.
CPC .............. *B60K 6/445* (2013.01); *B60K 6/547* (2013.01); *B60W 10/06* (2013.01); *B60W 10/08* (2013.01); *B60W 10/115* (2013.01); *B60W 10/26* (2013.01); *B60W 20/30* (2013.01); *B60W 30/1884* (2013.01); *B60W 30/19* (2013.01); *B60K 2006/381* (2013.01); *B60W 2510/0275* (2013.01); *B60W 2510/0638* (2013.01); *B60W 2510/0657* (2013.01); *B60W 2510/1005* (2013.01); *B60W 2510/1025* (2013.01); *B60W 2520/10* (2013.01); *B60W 2710/0644* (2013.01); *B60W 2710/0661* (2013.01); *B60W 2710/0666* (2013.01); *B60W 2710/082* (2013.01); *B60W 2710/083* (2013.01); *B60W 2710/1005* (2013.01); *B60W 2710/1022* (2013.01); *B60W 2710/248* (2013.01); *B60Y 2200/92* (2013.01); *Y02T 10/6221* (2013.01); *Y02T 10/6239* (2013.01); *Y02T 10/6286* (2013.01); *Y02T 10/7077* (2013.01); *Y02T 10/7275* (2013.01); *Y10S 903/911* (2013.01); *Y10S 903/93* (2013.01)

(56) References Cited

U.S. PATENT DOCUMENTS

| | | | |
|---|---|---|---|
| 2015/0266465 A1* | 9/2015 | Kato | B60W 10/26 701/22 |
| 2015/0344020 A1* | 12/2015 | Kato | B60W 10/08 701/22 |
| 2016/0108832 A1* | 4/2016 | Kumagai | B60K 6/445 701/22 |

* cited by examiner

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |

| OVERALL SPEED POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

CONTROL APPARATUS FOR HYBRID VEHICLE

This application claims priority from Japanese Patent Application No. 2016-245977 filed on Dec. 19, 2016, the disclosure of which is herein incorporated by reference in its entirety.

TECHNICAL FIELD

The present invention relates to a control device for a hybrid vehicle provided with a drive power source (an engine and a motor/generator) and an automatic transmission transmitting a drive force of the drive power source.

BACKGROUND ART

There is well known a control apparatus for a hybrid vehicle provided with an engine and a motor/generator functioning as a drive power source, an automatic transmission which constitutes a part of a power transmitting path between the drive power source and drive wheels and in which a shifting action is performed by selective engagement of a plurality of coupling devices, and an electric storage device giving/receiving electric power to/from the motor/generator. For example, this corresponds to a hybrid vehicle described in JP-2014-223888A. It is disclosed in JP-2014-223888A that an input torque to the automatic transmission is controlled by motor/generators (the first motor/generator and the second motor/generator in JP-2014-223888A) during a shifting action of the automatic transmission on the basis of an output torque of the engine and a transmitted torque of the coupling devices, such that an angular acceleration value defined as a value representing a rotating state of an input rotary member of the automatic transmission (angular acceleration value of the second motor/generator in JP-2014-223888A) coincides with a target value.

During a power-on shift-down action of the automatic transmission, a transmitted torque of the coupling devices may become insufficient for some reason, and the value representing the rotating state of the input rotary member of the automatic transmission may become larger than the target value (i.e., a rotating speed of the input rotary member of the automatic transmission may rise faster than the target). In such a case, the input torque to the automatic transmission is reduced lower than an original input torque to the automatic transmission when the value representing the rotating state of the input rotary member of the automatic transmission is made equal to the target value (e.g., an output torque of the motor/generator used as the basis of the input torque to the automatic transmission is reduced), so that the value representing the rotating state of the input rotary member of the automatic transmission coincides with the target value. In this case, the power corresponding to a reduction amount of the output torque of the motor/generator is stored as electric power into the electric storage device. If a chargeable electric power of the electric storage device is insufficient for the power corresponding to this reduction amount, the output torque of the motor/generator cannot sufficiently be reduced such that the value representing the rotating state of the input rotary member of the automatic transmission coincides with the target value. When the chargeable electric power of the electric storage device is insufficient, a rotating speed of the engine can be raised to consume as an inertia power a surplus power corresponding to a torque that cannot be reduced by reducing the output torque of the motor/generator with respect to an amount of the input torque to the automatic transmission required to be reduced for providing control such that the value representing the rotating state of the input rotary member of the automatic transmission coincides with the target value, and the input torque to the automatic transmission can thereby be reduced as much as necessary, so as to provide control such that the value representing the rotating state of the input rotary member of the automatic transmission coincides with the target value. However, the overspeeding of the engine may occur, possibly resulting in deterioration in component durability or giving a strange feeling to a driver.

SUMMARY OF THE INVENTION

The present invention was conceived in view of the situations and it is therefore an object of the present invention to provide a control apparatus for a hybrid vehicle capable of preventing or suppressing deterioration in component durability or a strange feeling given to a driver due to overspeeding of an engine at the time of a power-on shift-down action of an automatic transmission.

The object indicated above is achieved according to the following modes of the present invention:

According to a first mode of the invention, there is a provided a control apparatus for a hybrid vehicle provided with an engine and a motor/generator functioning as a drive power source, an automatic transmission which constitutes a part of a power transmitting path between the drive power source and drive wheels and in which a shifting action is performed by selective engagement of a plurality of coupling devices, and an electric storage device giving/receiving electric power to/from the motor/generator, the control apparatus comprising: a hybrid control portion controlling an input torque to the automatic transmission by the motor/generator during a shifting action of the automatic transmission on the basis of an output torque of the engine and a transmitted torque of the coupling devices, such that a value representing a rotating state of an input rotary member of the automatic transmission coincides with a target value; a racing determining portion determining whether a rotating speed of the engine is predicted to exceed a predetermined rotating speed when control is provided such that the value representing the rotating state of the input rotary member of the automatic transmission coincides with the target value during a power-on shift-down action of the automatic transmission; and an output limiting portion limiting the output torque of the engine to a predetermined torque or less if the rotating speed of the engine is predicted to exceed the predetermined rotating speed during the power-on shift-down action of the automatic transmission.

According to a second mode of the invention, the control apparatus according to the first mode of the invention is configured such that the racing determining portion determining whether the rotating speed of the engine is predicted to exceed the predetermined rotating speed based on at least one of a state of limitation of power of the electric storage device limiting an output torque of the motor/generator used as the basis of the input torque to the automatic transmission, a change amount of the rotating speed of the engine during the power-on shift-down action of the automatic transmission, and a vehicle speed.

According to a third mode of the invention, the control apparatus according to the first or second mode of the invention is configured such that the predetermined rotating speed is a synchronizing rotating speed of the rotating speed of the engine after the power-on shift-down action of the automatic transmission.

According to a fourth mode of the invention, the control apparatus according to any one of the first through third modes of the invention is configured such that the output limiting portion sets the predetermined torque based on at least one of a state of limitation of power of the electric storage device limiting the output torque of the motor/generator used as the basis of the input torque to the automatic transmission, a change amount of the rotating speed of the engine during the power-on shift-down action of the automatic transmission, and a vehicle speed.

According to a fifth mode of the invention, the control apparatus according to any one of the first through fourth modes of the invention is configured such that the output limiting portion initiates limitation of the output torque of the engine at a start of change in a rotating speed of the input rotary member of the automatic transmission due to the power-on shift-down action of the automatic transmission.

According to a sixth mode of the invention, the control apparatus according to any one of the first through fifth modes of the invention is configured such that the output limiting portion terminates limitation of the output torque of the engine when the power-on shift-down action of the automatic transmission is completed, when a progress degree of the power-on shift-down action has reached a predetermined progress degree, when a predetermined time has elapsed from start of control of the power-on shift-down action, or when a second predetermined time has elapsed from start of change in a rotating speed of the input rotary member of the automatic transmission due to the power-on shift-down action.

According to a seventh mode of the invention, the control apparatus according to any one of the first through fifth modes of the invention is configured such that the hybrid vehicle is provided with a differential mechanism comprising a first rotary element to which the engine is operatively connected, a second rotary element to which a first motor/generator is operatively connected, and a third rotary element to which an intermediate power transmitting member is connected, the motor/generator is a second motor/generator operatively connected to the intermediate power transmitting member, the automatic transmission is a step-variable transmission which constitutes a part of a power transmitting path between the intermediate power transmitting member and the drive wheels and in which each of a plurality of speed positions is formed by engagement of respectively predetermined coupling device out of the plurality of coupling devices, and the electric storage device gives/receives electric power to/from each of the first motor/generator and the second motor/generator. The control apparatus according to this seventh mode of the invention further comprises a shift control portion switching the speed position formed in the step-variable transmission by controlling release of a coupling device to be released out of the predetermined coupling devices forming the speed position before a shifting action and engagement of a coupling device to be engaged out of the predetermined coupling devices forming the speed position after a shifting action: The hybrid control portion is configured to control an output torque of the first motor/generator and an output torque of the second motor/generator during a shifting action of the step-variable transmission on the basis of the output torque of the engine and a transmitted torque to be transmitted through one of the plurality of coupling devices which causes a shifting action to progress out of the coupling devices to be released and to be engaged, such that an angular acceleration value of the second motor/generator and an angular acceleration value of the engine coincide with respective target values.

According to the first mode of the invention, if the rotating speed of the engine is predicted to exceed the predetermined rotating speed when the value representing the rotating state of the input rotary member of the automatic transmission is controlled to the target value during the power-on shift-down action of the automatic transmission, the output torque of the engine is controlled to the predetermined torque or less, so that the power-on shift-down action can be performed without causing the overspeeding of the engine. Therefore, a deterioration in component durability or a strange feeling given to a driver due to overspeeding of the engine can be prevented or suppressed at the time of the power-on shift-down action of the automatic transmission.

According to the second mode of the invention, since it is determined whether the rotating speed of the engine is predicted to exceed the predetermined rotating speed based on at least one of the state of limitation of power of the electric storage device, the change amount of the rotating speed of the engine during the power-on shift-down action of the automatic transmission, and the vehicle speed, the rotating speed of the engine is appropriately predicted to exceed the predetermined rotating speed during the power-on shift-down action.

According to the third mode of the invention, since the predetermined rotating speed is the synchronizing rotating speed of the rotating speed of the engine after the power-on shift-down action of the automatic transmission, it is determined whether the racing of the rotating speed of the engine is predicted to occur such that the rotating speed of the engine exceeds the synchronizing rotating speed (i.e., whether the overspeeding of the engine is predicted to occur).

According to the fourth mode of the invention, since the predetermined torque is set based on at least one of the state of limitation of power of the electric storage device, the change amount of the rotating speed of the engine during the power-on shift-down action of the automatic transmission, and the vehicle speed, the power-on shift-down action can appropriately be performed without causing the overspeeding of the engine.

According to the fifth mode of the invention, since the limitation of the output torque of the engine is initiated at the start of change in the rotating speed of the input rotary member of the automatic transmission due to the power-on shift-down action of the automatic transmission, the power-on shift-down action can appropriately be performed without causing the overspeeding of the engine.

According to the sixth mode of the invention, the limitation of the output torque of the engine is terminated when the power-on shift-down action of the automatic transmission is completed, or when the progress degree of the power-on shift-down action has reached the predetermined progress degree, or when the predetermined time has elapsed from the start of the control of the power-on shift-down action, or when the second predetermined time has elapsed from the start of change in the rotating speed of the input rotary member of the automatic transmission due to the power-on shift-down action, so that the output torque of the engine is limited appropriately while the possibility of occurrence of the overspeeding of the engine exists. From another viewpoint, if the possibility of occurrence of the overspeeding of the engine becomes lower, the torque of the engine is more easily output as requested.

According to the seventh mode of the invention, the power-on shift-down action can be performed without causing the overspeeding of the engine in the hybrid vehicle provided with the differential mechanism and the step-variable transmission in series. Therefore, a deterioration in component durability or a strange feeling given to a driver due to overspeeding of the engine can be prevented or suppressed at the time of the power-on shift-down action of the automatic transmission.

DETAILED DESCRIPTION OF PREFERRED EMBODIMENTS

Figure 1:
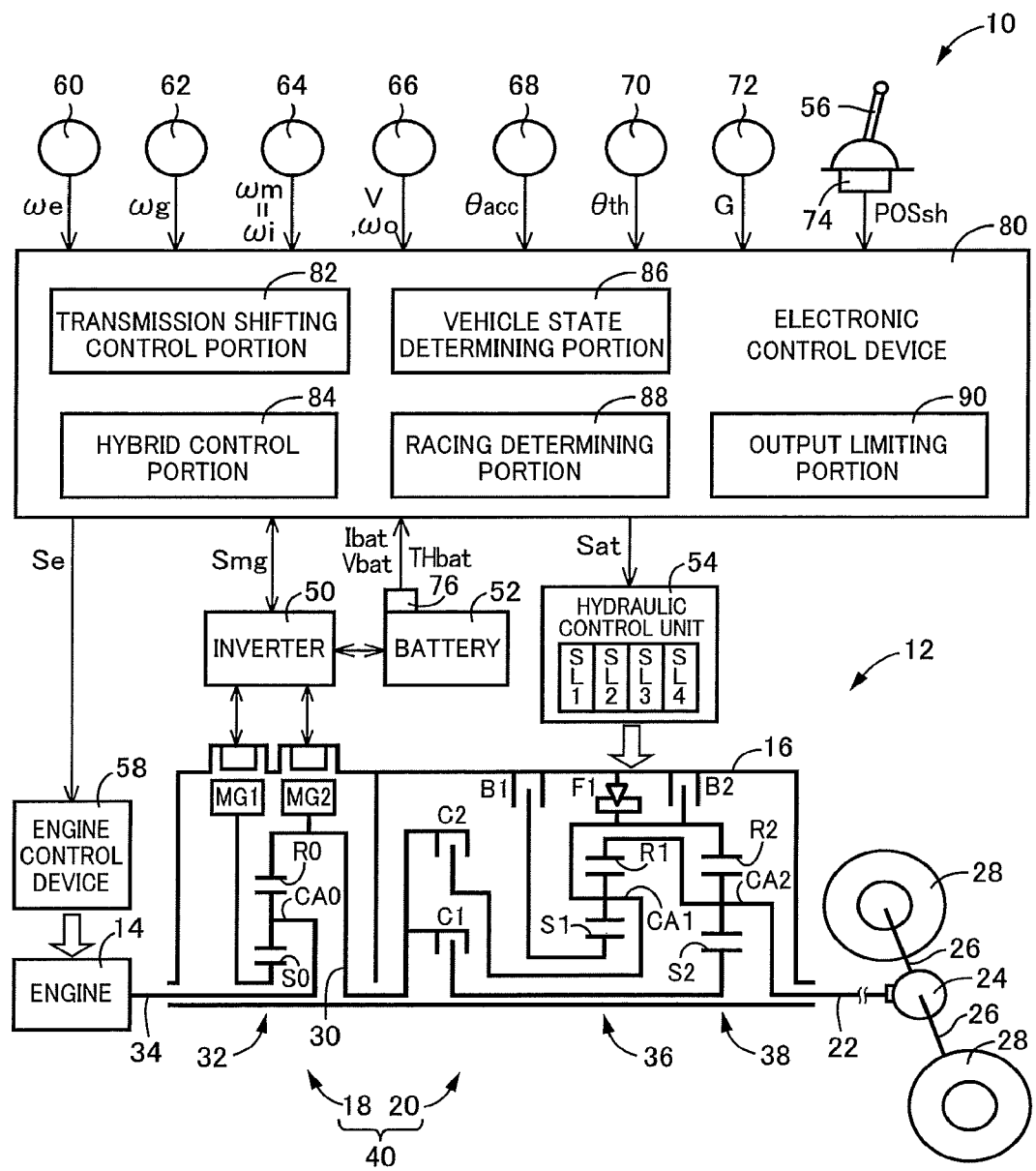
FIG. 1 is a schematic view showing an arrangement of a drive system of a vehicle to be controlled by a control apparatus according to the present invention, and major control functions and control portions of the control apparatus.

In the following embodiments of the invention, values representing the states of rotary motions of rotary members such as the above-described engine, motor/generator, first motor/generator, second motor/generator, rotary elements of the differential mechanism, intermediate power transmitting member and rotary elements of the automatic transmission include rotating speeds ω, and angular acceleration values dω/dt of the rotary members. The rotating speeds w of the rotary members correspond to angular velocities of the rotary members, and the angular acceleration values dω/dt of the rotary members are rates of change of the rotating speeds co, namely, time derivative values of the rotating speeds ω. In the mathematical equation (1) given below, the angular acceleration values dω/dt are represented by co with a dot superposed thereon.

Referring to the drawings, preferred embodiments of the present invention will be described in detail.

EMBODIMENTS

Reference is first made to FIG. 1, which is the schematic view showing an arrangement of a drive system 12 of a vehicle 10 to be controlled by a control apparatus according to the present invention, and major portions of the control apparatus to perform various controls of the vehicle 10. As shown in FIG. 1, the vehicular drive system 12 is provided with an engine 14 functioning as a drive power source, an electrically controlled continuously variable transmission portion 18 (hereinafter referred to as "continuously variable transmission portion 18") connected directly or indirectly via a damper (not shown) or any other device to the engine 14, and a mechanically operated step-variable transmission portion 20 (hereinafter referred to as "step-variable transmission portion 20) connected to an output rotary member of the continuously variable transmission portion 18. The continuously variable transmission portion 18 and the step-variable transmission portion 20 are disposed in series with each other within a transmission casing 16 (hereinafter referred to as "casing 16") functioning as a stationary member fixed to a vehicle body, such that the transmission portions 18 and 20 are disposed coaxially with each other on a common axis. The vehicular drive system 12 is further provided with a differential gear mechanism 24 connected to an output rotary member of the step-variable transmission portion 20 in the form of an output shaft 22, and a pair of axles 26 connected to the differential gear mechanism 24. In the vehicular drive system 12, a drive force ("drive torque" or "drive power" unless otherwise distinguished from the drive force) of the engine 14 and a second motor/generator MG2 (described below) is transmitted to the step-variable transmission portion 20, and is transmitted from the step-variable transmission portion 20 to drive wheels 28 of the vehicle 10 through the differential gear mechanism 24 and other devices. The vehicular drive system 12 is suitably used in the vehicle 10 of an FR type (front-engine rear-drive type) in which the axis of the engine 14 is parallel to the longitudinal direction of the vehicle 10. It is noted that the continuously variable transmission portion 18 and the step-variable transmission portion 20 are constructed substantially symmetrically with each other about the axis of the engine 14 (about the above-indicated common axis), and that FIG. 1 does not show the lower halves of the transmission portions 18 and 20.

The engine 14 is the drive power source to drive the vehicle 10, which is a known internal combustion engine such as a gasoline engine or a diesel engine. An engine torque Te which is an output torque of this engine 14 is controlled by an electronic control device 80 (described below) which controls the operating condition of the engine 14 as represented by an opening angle of a throttle valve or an intake air quantity, an amount of injection of a fuel and an ignition timing. In the present embodiment, the engine 14 is connected to the continuously variable transmission portion 18, without a fluid-operated type power transmitting device such as a torque converter or a fluid coupling being disposed between the engine 14 and the transmission portion 18.

The continuously variable transmission portion 18 is provided with: a first motor/generator MG1; a differential mechanism 32 functioning as a power distributing device to mechanically distribute the drive force of the engine 14 to the first motor/generator MG1, and to an intermediate power transmitting member 30 which is an output rotary member of the continuously variable transmission portion 18; and the second motor/generator MG2 operatively connected to the intermediate power transmitting member 30. The continuously variable transmission portion 18 is an electrically controlled continuously variable transmission wherein a differential state of the differential mechanism 32 is controllable by controlling an operating state of the first motor/generator MG1. The first motor/generator MG1 functions as a differential motor/generator (a differential motor) while the second motor/generator MG2 is a motor/generator (an electric motor) which functions as a drive power source, namely, a vehicle driving motor/generator. The vehicle 10 is a hybrid vehicle provided with the drive power source in the form of the engine 14 and the second motor/generator MG2.

Each of the first motor/generator MG1 and the second motor/generator MG2 is an electrically operated rotary device having a function of an electric motor and a function of an electric generator. The first motor/generator MG1 and the second motor/generator MG2 are connected to an electric power storage device in the forum of a battery 52 through an inverter 50. The inverter 50 provided on the vehicle 10 is controlled by the control apparatus in the form of the above-indicated electronic control device 80 described below in detail, to control an output torque (regenerative torque) of the first motor/generator MG1, namely, an MG1 torque Tg, and an output torque (forward driving torque) of the second motor/generator MG2, namely, an MG2 torque Tm. The battery 52 also provided on the vehicle 10 is the electric power storage device to and from which an electric power is supplied from and to the first motor/generator MG1 and the second motor/generator MG2.

The differential mechanism 32 is a planetary gear set of a single-pinion type having a sun gear S0, a carrier CA0 and a ring gear R0. The carrier CA0 is operatively connected to the engine 14 through a connecting shaft 34 in a power transmittable manner, and the sun gear S0 is operatively connected to the first motor/generator MG1 in a power transmittable manner, while the ring gear R0 is operatively connected to the second motor/generator MG2 in a power transmittable manner. In the differential mechanism 32, the carrier CA0 functions as an input rotary element, and the sun gear S0 functions as a reaction rotary element, while the ring gear R0 functions as an output rotary element.

The step-variable transmission portion 20 is a step-variable transmission which constitutes a part of a power transmitting path between the intermediate power transmitting member 30 and the drive wheels 28. The intermediate power transmitting member 30 also functions as an input rotary member of the step-variable transmission portion 20. The step-variable transmission portion 20 is considered to also constitute a part of a power transmitting path between the drive power source (second motor/generator MG2 or engine 14) and the drive wheels 28, since the second motor/generator MG2 is connected to the intermediate power transmitting member 30 such that the intermediate power transmitting member 30 is rotated together with the second motor/generator MG2, or since the engine 14 is connected to an input rotary member of the continuously variable transmission portion 18. The step-variable transmission portion 20 is a known automatic transmission of a planetary gear type which is provided with a plurality of planetary gear sets in the form of a first planetary gear set 36 and a second planetary gear set 38, and a plurality of coupling devices in the form of a clutch C1, a clutch C2, a brake B1 and a brake B2 (hereinafter referred to as "coupling devices CB" unless otherwise specified).

Each of the coupling devices CB is a hydraulically operated frictional coupling device in the form of a multiple-disc type or a single-disc type clutch or brake that is operatively pressed by a hydraulic actuator, or a band brake that is operatively tightened by a hydraulic actuator. The coupling devices CB are selectively placed in engaged, slipped or released states with their torque capacities (engaging torque values or CB-transmitted torque values) Tcb being changed according to engaging hydraulic pressures PRcb applied thereto, which are regulated by respective solenoid-operated valves SL1-SL4 incorporated within a hydraulic control unit 54. In order for each coupling device CB to be able to transmit a torque (for example, an AT input torque Ti which is an input torque of the step-variable transmission portion 20) between the intermediate power transmitting member 30 and the output shaft 22, without a slipping action (without a speed difference between input and output elements of the coupling device CB), the relevant coupling device CB should be given an engaging torque Tcb enough to permit transmission of a component of the input torque, which is assigned to be transmitted by the coupling device CB in question, that is, to permit transmission of an assigned torque (CB-transmitted torque) to be transmitted through an engaging action of the coupling device CB. However, it is noted that an increase of the engaging torque Tcb enough to obtain the CB-transmitted torque does not cause an increase of the CB-transmitted torque. That is, the engaging torque Tcb is equivalent to a maximum value of the torque that can be transmitted through the coupling device CB, and the CB-transmitted torque is equivalent to the torque that is actually transmitted through the coupling device CB. Therefore, the engaging torque Tcb and the CB-transmitted torque are equal to each other in the process of the engaging action of the coupling device CB with a speed difference between its input and output elements. In the present embodiment, the CB-transmitted torque in the process of a shifting action of the step-variable transmission portion 20 with a speed difference of the input and output elements (for example, the CB-transmitted torque during an inertia phase of the shifting action) is represented by the engaging torque Tcb (namely, CB-transmitted torque Tcb). It is noted that the engaging torque (CB-transmitted torque) Tcb and the engaging hydraulic pressure PRcb are proportional to each other, before the engaging hydraulic pressure PRcb has been raised to initiate an engaging contact of the input and output elements with each other.

In the step-variable transmission portion 20, selected ones of rotary elements (sun gears S1 and S2, carriers CA1 and CA2, and ring gears R1 and R2) of the first and second planetary gear sets 36 and 38 are connected to each other or to the intermediate power transmitting member 30, casing 16 or output shaft 22, either directly or indirectly (selectively) through the coupling devices CB or a one-way clutch F1.

The step-variable transmission portion 20 is shifted to a selected one of four AT gear positions (speed positions) by engaging actions of selected ones of the coupling devices CB. These four AT gear positions have respective different speed ratios γat (=AT input speed ωi/AT output speed ωo). Namely, the step-variable transmission portion 20 is shifted up and down from one gear position to another by placing selected ones of the coupling devices CB in the engaged state. The AT input speed ωi is a rotating speed (angular velocity) of the input rotary member of the step-variable transmission portion 20, that is, a rotating speed of the intermediate power transmitting member 30, which is equal to an MG2 speed ωm which is an operating speed of the second motor/generator MG2. Thus, the AT input speed ωi can be represented by the MG2 speed ωm. The AT output speed ωo is a rotating speed of the output shaft 22 of the step-variable transmission portion 20, which is considered to be an output speed of a transmission device 40 which consists of the continuously variable transmission portion 18 and the step-variable transmission portion 20.

Figures 2, 3:
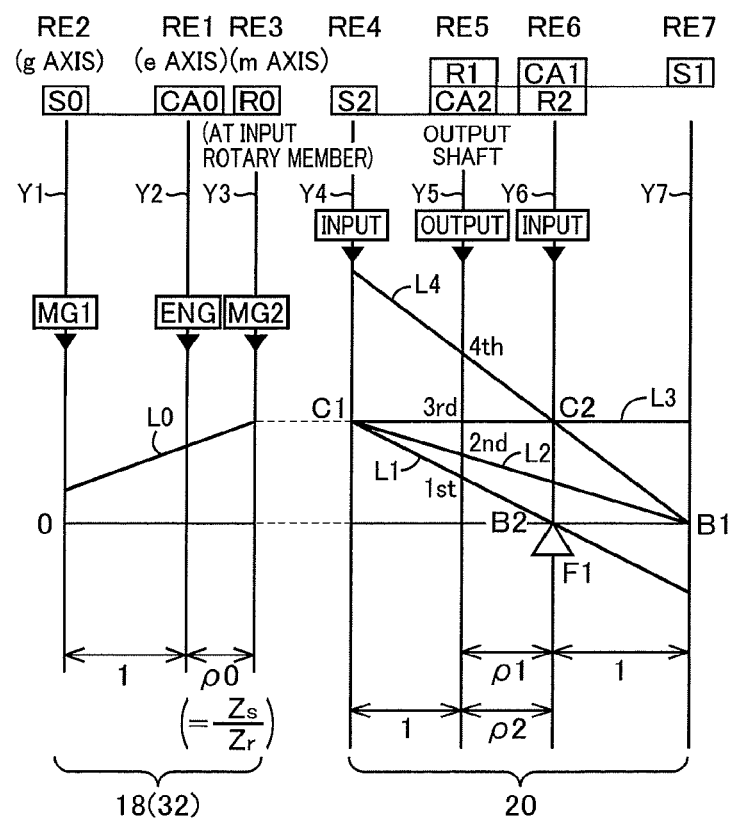
FIG. 2 is a table indicating a relationship between gear positions of a mechanically operated step-variable transmission portion shown in FIG. 1 and combinations of coupling devices placed in engaged states to establish the respective gear positions.
FIG. 3 is a collinear chart indicating a relationship among rotating speeds of rotary elements of an electrically controlled continuously variable transmission portion also shown in FIG. 1 and the mechanically operated step-variable transmission portion.

Reference is now made to FIG. 2, which is the table indicating the relationship between the first through fourth speed AT gear positions of the step-variable transmission portion 20 shown in FIG. 1 and combinations of the coupling devices CB placed in the engaged states to establish the respective AT gear positions. In the table, the four forward AT gear positions are respectively represented by "1st", "2nd", "3rd" and "4th". The first speed AT gear position "1st" has a highest speed ratio γat, and the speed ratios γat of the four AT gear positions decrease in the direction from the first speed AT gear position (lowest-speed gear position) "1st" toward the fourth speed AT gear position (highest-speed gear position) "4th". In the table, "O" indicates the engaged state of the coupling devices CB, "Δ" indicates the engaged state of the coupling device B2 during application of an engine brake to the vehicle 10 or during a shift-down action of the step-variable transmission portion 20 while the vehicle 10 is in a coasting run, while the blank indicates the released state of the coupling devices CB. The one-way clutch F1 indicated above is disposed in parallel to the brake B2 which is placed in the engaged state to establish the first speed AT gear position "1st", so that the brake B2 is not required to be placed in the engaged state upon starting or acceleration of the vehicle 10. The above-indicated shift-down action of the step-variable transmission portion 20 in the coasting run of the vehicle 10 is kind of a "power-off shift-down action" which is required as a result of reduction of a vehicle-speed-related value (vehicle running speed V, for example) due to reduction of a required drive force (as represented by an operation amount θacc of an accelerator pedal) or during deceleration of the vehicle 10 in a released position of the accelerator pedal (with the operation amount θacc of the accelerator pedal being zero or substantially zero), and is a shift-down action which is required during deceleration of the vehicle 10 in the released position of the accelerator pedal. It is noted that the step-variable transmission portion 20 is placed in a neutral position (a power transmission cutoff state) when all of the coupling devices CB are placed in the released states.

The step-variable transmission portion 20 is shifted up or down to establish a newly selected one of the four AT gear positions, according to the operation amount θacc of the accelerator pedal and the vehicle running speed V, with a releasing action of one of the coupling devices CB and a concurrent engaging action of another coupling device CB, which concurrent releasing and engaging actions are controlled by the above-indicated electronic control device 80, more specifically, by a transmission shifting control portion 82 configured to control shifting actions of the step-variable transmission portion 20. The above-indicated one coupling device CB was placed in the engaged state before the step-variable transmission portion 20 is shifted to establish the newly selected AT gear position, while the above-indicated another coupling device CB is placed in the engaged state while the step-variable transmission portion 20 is placed in the newly selected AT gear position. Thus, the step-variable transmission portion 20 is shifted up or down from one of the AT gear positions to another by so-called "clutch-to-clutch" shifting operation, namely, concurrent releasing and engaging actions of the selected two coupling devices CB. For instance, the step-variable transmission portion 20 is shifted down from the second speed AT gear position "2nd" to the first speed AT gear position "1st", with the releasing action of the brake B1 and the concurrent engaging action of the brake B2, as indicated in the table of FIG. 2. In this instance, the hydraulic pressures applied to the brakes B1 and B2 are transiently controlled to bring these brakes B1 and B2 into the released and engaged states, respectively.

The collinear chart of FIG. 3 indicates the relationship among rotating speeds of the rotary elements of the continuously variable transmission portion 18 and the step-variable transmission portion 20. In this collinear chart, three vertical lines Y1, Y2 and Y3 corresponding to the respective three rotary elements of the differential mechanism 32 of the continuously variable transmission portion 18 respectively represent a "g" axis representing the rotating speed of the second rotary element RE2 in the form of the sun gear S0, an "e" axis representing the rotating speed of the first rotary element RE1 in the form of the carrier CA0, and an "m" axis representing the rotating speed of the third rotary element RE3 in the form of the ring gear R0 (i.e., the input rotating speed of the step-variable transmission portion 20). Further, four vertical lines Y4, Y5, Y6 and Y7 corresponding to the respective four rotary elements of the step-variable transmission portion 20 respectively represent an axis representing the rotating speed of the fourth rotary element RE4 in the form of the sun gear S2, an axis representing the rotating speed of the fifth rotary element RE5 in the form of the ring gear R1 and the carrier CA2 fixed to each other, namely, the rotating speed of the output shaft 22, an axis representing the rotating speed of the sixth rotary element RE6 in the form of the carrier CA1 and the ring gear R2 fixed to each other, and an axis representing the rotating speed of the seventh rotary element RE7 in the form of the sun gear S1. The distances between the adjacent ones of the vertical lines Y1, Y2 and Y3 are determined by a gear ratio ρ0 of the differential mechanism 32, while the distances between the adjacent ones of the vertical lines Y4-Y7 are determined by gear ratios ρ1 and ρ2 of the respective first and second planetary gear sets 36 and 38. Where the distance between the axis representing the rotating speed of the sun gear S0, S1, S2 and the axis representing the rotating speed of the carrier CA0, CA1, CA2 corresponds to "1", the distance between the axis representing the rotating speed of the carrier CA0, CA1, CA2 and the axis representing the rotating speed of the ring gear R0, R1, R2 corresponds to the gear ratio ρ of the planetary gear set (=number of teeth Zs of the sun gear/number of teeth Zr of the ring gear).

Referring to the collinear chart of FIG. 3, the differential mechanism 32 of the continuously variable transmission portion 18 is arranged such that the engine 14 (represented as "ENG" in the collinear chart) is connected to the first rotary element RE1, and the first motor/generator MG1 (represented as "MG1" in the collinear chart) is connected to the second rotary element RE2, while the second motor/generator MG2 (represented as "MG2" in the collinear chart) is connected to the third rotary element RE3 which is rotated together with the intermediate power transmitting member 30. Thus, a rotary motion of the engine 14 is transmitted to the step-variable transmission portion 20 through the intermediate power transmitting member 30. In a part of the collinear chart corresponding to the continuously variable transmission portion 18, a straight line L0 intersecting the vertical line Y2 represents a relationship between the rotating speeds of the sun gear S0 and the ring gear R0.

The step-variable transmission portion 20 is arranged such that the fourth rotary element RE4 is selectively connected to the intermediate power transmitting member 30 through the clutch C1, the fifth rotary element RE5 is connected to the output shaft 22, the sixth rotary element RE6 is selectively connected to the intermediate power transmitting member 30 through the clutch C2 and is selectively connected to the casing 16 through the brake B2, and the seventh rotary element RE7 is selectively connected to the casing 16 through the brake B1. In a part of the collinear chart corresponding to the step-variable transmission portion 20, straight lines L1, L2, L3 and L4 intersecting the vertical line Y5 represent the rotating speeds of the output shaft 22 in the respective first, second, third and fourth speed AT gear positions "1st", "2nd", "3rd" and "4th" that are selectively established by control for engaging and releasing the coupling devices CB.

Solid straight lines L0, L1, L2, L3 and L4 shown in the collinear chart of FIG. 3 indicate the relative rotating speeds of the rotary elements in a hybrid drive mode in which the vehicle 10 is driven in the forward direction with at least the engine 14 being operated as a drive power source. In the differential mechanism 32 during this hybrid drive mode, when a torque Te of the engine 14 (engine torque Te) is applied to the carrier CA0 while a reaction torque which is a negative torque generated by the first motor/generator MG1 operated in the positive direction is applied to the sun gear S0, a directly transmitted engine torque $Td(=Te/(1+\rho)=-(1/\rho)*Tg)$ which is a positive torque is applied to the ring gear R0 and rotating the ring gear R0 in the positive direction. The vehicle 10 is driven in the forward direction with a vehicle drive torque which is a sum of the directly transmitted engine torque Td and the MG2 torque Tm and which is transmitted to the drive wheels 28 through the step-variable transmission portion 20 selectively placed in one of the first through fourth speed AT gear positions according to a required vehicle drive force. At this time, the first motor/generator MG1 functions as an electric generator operated in the positive direction and generating a negative torque. An electric power Wg generated by the first motor/generator MG1 is stored in the battery 52 or consumed by the second motor/generator MG2. The second motor/generator MG2 is operated to generate the MG2 torque Tm, with all or a part of the electric power Wg generated by the first motor/generator MG1, or a sum of the generated electric power Wg and the electric power supplied from the battery 52.

In the differential mechanism 32 during a motor drive mode in which the vehicle 10 is driven with a drive force generated by the second motor/generator MG2 operated as a drive power source while the engine 14 is held at rest, the carrier CA0 is held stationary while the MG2 torque Tm which is a positive torque is applied to the ring gear R0 and rotating the ring gear R0 in the positive direction. The state of the differential mechanism in this motor drive mode is not shown in the collinear chart of FIG. 3. At this time, the first motor/generator MG1 connected to the sun gear S0 is placed in a non-load state and freely operated in the negative direction. Namely, in the motor drive mode, the engine 14 is held in a non-operated state, so that an operating speed ωe of the engine 14 (engine speed ωe) is kept zero, and the vehicle 10 is driven in the forward direction with the MG2 torque Tm (positive forward driving torque), which is transmitted as a forward drive torque to the drive wheels 28 through the step-variable transmission portion 20 placed in one of the first through fourth speed AT gear positions. When the vehicle 10 is driven in the rearward direction, in the motor drive mode, for example, the MG2 torque Tm which is a negative torque is applied to the ring gear R0 and rotating the ring gear R0 in the negative direction, and is transmitted as rear drive torque of the vehicle 10 to the drive wheels 28 through the step-variable transmission portion 20 placed in the first speed AT gear position.

In the vehicular drive system 12, the continuously variable transmission portion 18 functions as an electrically controlled shifting mechanism (electrically controlled differential mechanism) provided with the differential mechanism 32 the differential state of which is controlled by controlling the operating state of the first motor/generator MG1, and which has the three rotary elements, that is, the first rotary element RE1 in the form of the carrier CA0 to which the engine 14 is operatively connected in a power transmittable manner, the second rotary element RE2 in the form of the sun gear S0 to which the first motor/generator MG1 is operatively connected in a power transmittable manner, and the third rotary element RE3 in the form of the ring gear R0 to which the intermediate power transmitting member 30 is connected (in other words, to which the second motor/generator MG2 is operatively connected) in a power transmittable manner. Namely, the continuously variable transmission portion 18 has the differential mechanism 32 to which the engine 14 is operatively connected in a power transmittable manner, and the first motor/generator MG1 to which the differential mechanism 32 is operatively connected in a power transmittable manner, and the operating state of which is controlled to control the differential state of the differential mechanism 32. The continuously variable transmission portion 18 is operated as an electrically controlled continuously variable transmission a speed ratio γ0 (=ωe/ωm) of which is variable. The speed ratio is a ratio of rotating speed of the connecting shaft 34 (namely, engine speed ωe) to the rotating speed of the intermediate power transmitting member 30 (namely, MG2 speed ωm).

In the hybrid drive mode, for instance, the rotating speed of the sun gear S0 is raised or lowered by controlling an operating speed of the first motor/generator MG1 while the rotating speed of the ring gear R0 is determined by rotating speed of the drive wheels 28 with the step-variable transmission portion 20 placed in one of the AT gear positions, so that the rotating speed of the carrier CA0 (namely, engine speed ωe) is accordingly raised or lowered. In running with operation of the engine 14, therefore, the engine 14 can be operated at an efficient operating point. That is, the step-variable transmission portion 20 to be placed in a selected one of the AT gear positions and the continuously variable transmission portion 18 functioning as a continuously variable transmission cooperate to provide the transmission device 40 in which the continuously variable transmission portion 18 (differential mechanism 32) and the step-variable transmission portion 20 are disposed in series with each other and which functions as a continuously variable transmission as a whole.

Alternatively, the continuously variable transmission portion 18 can be shifted like a step-variable transmission.

Accordingly, the transmission device 40 constituted by the step-variable transmission portion 20 to be placed in one of the AT gear positions and the continuously variable transmission portion 18 which can be shifted like the step-variable transmission can be shifted like a step-variable transmission as a whole. That is, the step-variable transmission portion 20 and the continuously variable transmission portion 18 can be controlled to selectively establish a plurality of speed positions (hereinafter referred to as "overall speed positions" although it may be referred also to as "conceptual speed positions") having respective different values of a speed ratio $\gamma t$ ($=\omega e/\omega$) which is a ratio of the engine speed $\omega e$ to the output speed $\omega o$. The speed ratio $\gamma t$ is an overall speed ratio of the transmission device 40 consisting of the continuously variable transmission portion 18 and the step-variable transmission portion 20 which are disposed in series with each other. The overall speed ratio $\gamma t$ is equal to a product of the speed ratio $\gamma 0$ of the continuously variable transmission portion 18 and the speed ratio $\gamma at$ of the step-variable transmission portion 20, namely, $\gamma t=\gamma 0*\gamma at$.

Figures 4, 5:
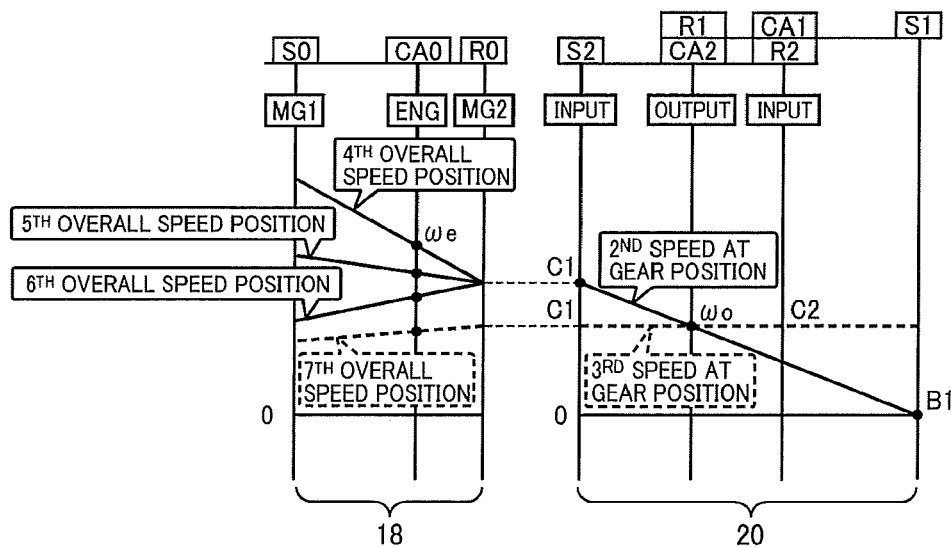
FIG. 4 is a table indicating an example of a plurality of overall speed positions of a transmission device in relation to the gear positions of the step-variable transmission portion.
FIG. 5 is a view indicating some examples of the gear positions of the step-variable transmission portion and some examples of the overall speed positions of the transmission device, on a collinear chart similar to that of FIG. 3.

At least one overall speed position is provided for each of the four AT gear positions of the step-variable transmission portion 20, with a combination of each AT gear position with at least one of the different speed ratio values $\gamma 0$ of the continuously variable transmission portion 18. FIG. 4 is the table indicating an example of the overall speed positions of the transmission device 40, wherein first through third overall speed positions are established for the first speed AT gear position, fourth through sixth overall speed positions are established for the second speed AT gear position, seventh through ninth overall speed positions are established for the third speed AT gear position, and a tenth overall speed position is established for the fourth speed AT gear position.

FIG. 5 is the view indicating some examples of the AT gear positions of the step-variable transmission portion 20 and some examples of the overall speed positions of the transmission device 40, on a collinear chart similar to that of FIG. 3. In FIG. 5, solid lines indicate the fourth through sixth overall speed positions established when the step-variable transmission portion 20 is placed in the second speed AT gear position. In the transmission device 40, the continuously variable transmission portion 18 is controlled to control the engine speed $\omega e$ with respect to the output speed $\omega o$ for establishing the predetermined overall speed ratio values $\gamma t$, to thereby establish the different overall speed position or positions for each of the AT gear positions. A broken line indicates the seventh overall speed position established when the step-variable transmission portion 20 is placed in the third speed AT gear position. In the transmission device 40, the continuously variable transmission portion 18 is controlled according to the selected one of the AT gear positions, for shifting the transmission device 40 from one of the overall speed positions to another.

Referring back to FIG. 1, the vehicle 10 is provided with the control apparatus in the form of the electronic control device 80 configured to control various devices of the vehicle 10 such as the engine 14, continuously variable transmission portion 18 and step-variable transmission portion 20. FIG. 1 is the view showing input and output signals of the electronic control device 80, and is a functional block diagram showing major control functions and control portions of the electronic control device 80. For example, the electronic control device 80 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control device 80 may be constituted by two or more control units exclusively assigned to perform different control operations such as engine control operations and transmission shifting control operations.

The electronic control device 80 receives various input signals such as: an output signal of an engine speed sensor 60 indicative of the engine speed $\omega e$; an output signal of an MG1 speed sensor 62 indicative of the MG1 speed $\omega g$ which is the operating speed of the first motor/generator MG1; an output signal of an MG2 speed sensor 64 indicative of the MG2 speed $\omega m$ which is the AT input speed $\omega i$; an output signal of an output speed sensor 66 indicative of the output speed $\omega$ corresponding to the vehicle running speed V; an output signal of an accelerator pedal operation amount sensor 68 indicative of the operation amount $\theta acc$ of the accelerator pedal, which operation amount $\theta acc$ represents a degree of acceleration of the vehicle 10 required by a vehicle operator; an output signal of a throttle valve opening angle sensor 70 indicative of an angle $\theta th$ of opening of an electronic throttle valve; an output signal of an acceleration sensor 72 indicative of a longitudinal acceleration value G of the vehicle 10; an output signal of a shift position sensor 74 indicative of a presently selected operating position POSsh of a manually operated shifting member in the form of a shift lever 56 provided in the vehicle 10; and output signals of a battery sensor 76 indicative of a temperature THbat, a charging/discharging electric current Ibat and a voltage Vbat of the battery 52. Further, the electronic control device 80 generates various output signals such as: an engine control command signal Se to be applied to an engine control device 58 provided to control a throttle actuator, a fuel injecting device and an ignition device, for controlling the engine 14; motor/generator control command signals Smg to be applied to the inverter 50, for controlling the first motor/generator MG1 and the second motor/generator MG2; and hydraulic control command signals Sat to be applied to the hydraulic control unit 54, for controlling the operating states of the coupling devices CB (namely, for controlling the shifting actions of the step-variable transmission portion 20). The hydraulic control command signals Sat are command signals (drive currents) to be applied to the hydraulic control unit 54 for controlling amounts of electric currents to be applied to the solenoid-operated valves SL1-SL4 which regulate the engaging hydraulic pressure PRcb to be applied to each of the hydraulic actuators of the coupling devices CB. The electronic control device 80 operates to set a hydraulic pressure command value (command pressure) corresponding to the engaging hydraulic pressure PRcb to be applied to each of the hydraulic actuators, for establishing a target value of the engaging torque Tcb of the corresponding coupling device CB, and outputs a drive current corresponding to the hydraulic pressure command value.

The electronic control device 80 is configured to calculate a charging state (stored electric power amount) SOC of the battery 52 on the basis of the charging/discharging electric current Ibat and the voltage Vbat of the battery 52. The electronic control device 80 is further configured to calculate, based on, for example, the temperature THbat and the charging state SOC of the battery 52, a maximum charging amount Win of electric power that can be stored in the battery 52, and a maximum discharging amount Wout of electric power that can be discharged from the battery 52, which maximum charging and discharging amounts Win and Wout define a range of an electric power (battery power) Pbat of the battery 52 that can be used. The calculated maximum charging and discharging amounts Win and Wout decrease with a decrease of the battery temperature THbat when the battery temperature THbat is lower than a normal level, and decrease with an increase of the battery temperature THbat when the battery temperature THbat is higher than the normal level. Further, the maximum charging amount Win decreases with an increase of the stored electric power amount SOC when the stored electric power amount SOC is relatively large. The maximum discharging amount Wout decreases with a decrease of the stored electric power amount SOC when the stored electric power amount SOC is relatively small.

The electronic control device 80 includes a shift control means or portion in the form of a transmission shifting control portion 82, and a hybrid control means or portion in the form of a hybrid control portion 84, for performing various controls in the vehicle 10.

The transmission shifting control portion 82 is configured to determine a shifting action of the step-variable transmission portion 20 according to a memory-stored AT gear position shifting map obtained by experimentation or determined by an appropriate design theory, and applies the hydraulic control command signals Sat to the hydraulic control unit 54, for commanding the solenoid-operated valves SL1-SL4 to bring the appropriate ones of the coupling devices CB into the released and engaged states, for automatically shifting up or down the step-variable transmission portion 20. The AT gear position shifting map indicated above is a predetermined relationship between two variables in the form of the output speed ωo (equivalent to the vehicle running speed V) and the accelerator pedal operation amount θacc (equivalent to a required drive torque Tdem and the throttle valve opening angle θth), which relationship is used to determine a shifting action of the step-variable transmission portion 20 and is represented by shift-up and shift-down shifting lines in a two-dimensional coordinate system in which the output speed ωo and the accelerator pedal operation amount θacc are taken along respective two axes.

The hybrid control portion 84 has a function of an engine control means or portion to control the engine 14, and a function of a motor/generator control means or portion to control the first motor/generator MG1 and the second motor/generator MG2 through the inverter 50. Thus, the hybrid control portion 84 performs hybrid drive controls for controlling the engine 14, first motor/generator MG1 and second motor/generator MG2. The hybrid control portion 84 is configured to calculate a required vehicle drive power Pdem on the basis of the accelerator pedal operation amount θacc and the vehicle running speed V, and according to a predetermined relationship in the form of a drive force map, for instance. In other words, the hybrid control portion 84 calculates the required drive torque Tdem at the present vehicle running speed V. The hybrid control portion 84 generates the engine control command signal Se to control the engine 14, and the motor/generator control command signals Smg to control the first motor/generator MG1 and the second motor/generator MG2, for establishing the required vehicle drive power Pdem, while taking account of the maximum charging and discharging amounts Win and Wout of electric power of the battery 52. For example, the engine control command signal Se represents a command value of an engine power Pe which is a power of the engine 14 outputting the torque Te at its present operating speed ωe. For example, the motor/generator control command signals Smg represent a command value of an electric power amount Wg to be generated by the first motor/generator MG1 to generate the reaction torque acting against the engine torque Te, namely, the MG1 torque Tg at the present MG1 speed ωg, and an electric power amount Wm to be consumed by the second motor/generator MG2 to generate the MG2 torque Tm at the present MG2 speed ωm.

When the transmission device 40 as a whole is operated as the continuously variable transmission while the continuously variable transmission portion 18 is operated as the continuously variable transmission, for instance, the hybrid control portion 84 controls the engine 14 and the electric power amount Wg to be generated by the first motor/generator MG1, so as to establish the engine speed ωe and the engine torque Te for obtaining the engine power Pe to establish the required vehicle drive power Pdem, while taking account of a highest fuel economy point of the engine 14, so that the speed ratio γ0 of the continuously variable transmission portion 18 is controlled so as to be continuously varied. As a result, the speed ratio γt of the transmission device 40 is controlled while the continuously variable transmission portion 18 is operated as the continuously variable transmission.

When the transmission device 40 as a whole is operated as the step-variable transmission while the continuously variable transmission portion 18 is operated as the step-variable transmission, for instance, the hybrid control portion 84 determines a shifting action of the transmission device 40 according to an overall speed position shifting map, for example, and performs a shifting control of the continuously variable transmission portion 18 to establish a selected one of the plurality of overall speed positions, in cooperation with the transmission shifting control portion 82 to shift the step-variable transmission portion 20 selectively to the AT gear positions. The plurality of overall speed positions can be established by controlling the first motor/generator MG1 to control the engine speed ωe according to the output speed ωo so as to maintain the respective speed ratio values γt. It is noted that the speed ratio γt in each of the overall speed positions does not necessarily have to be constant over all ranges of the output speed ωo, but may be changed in a certain range or ranges of the output speed ωo or may be given a limitation or limitations, for example, depending on upper and lower limits of rotating speeds of respective rotatable elements.

Figure 6:
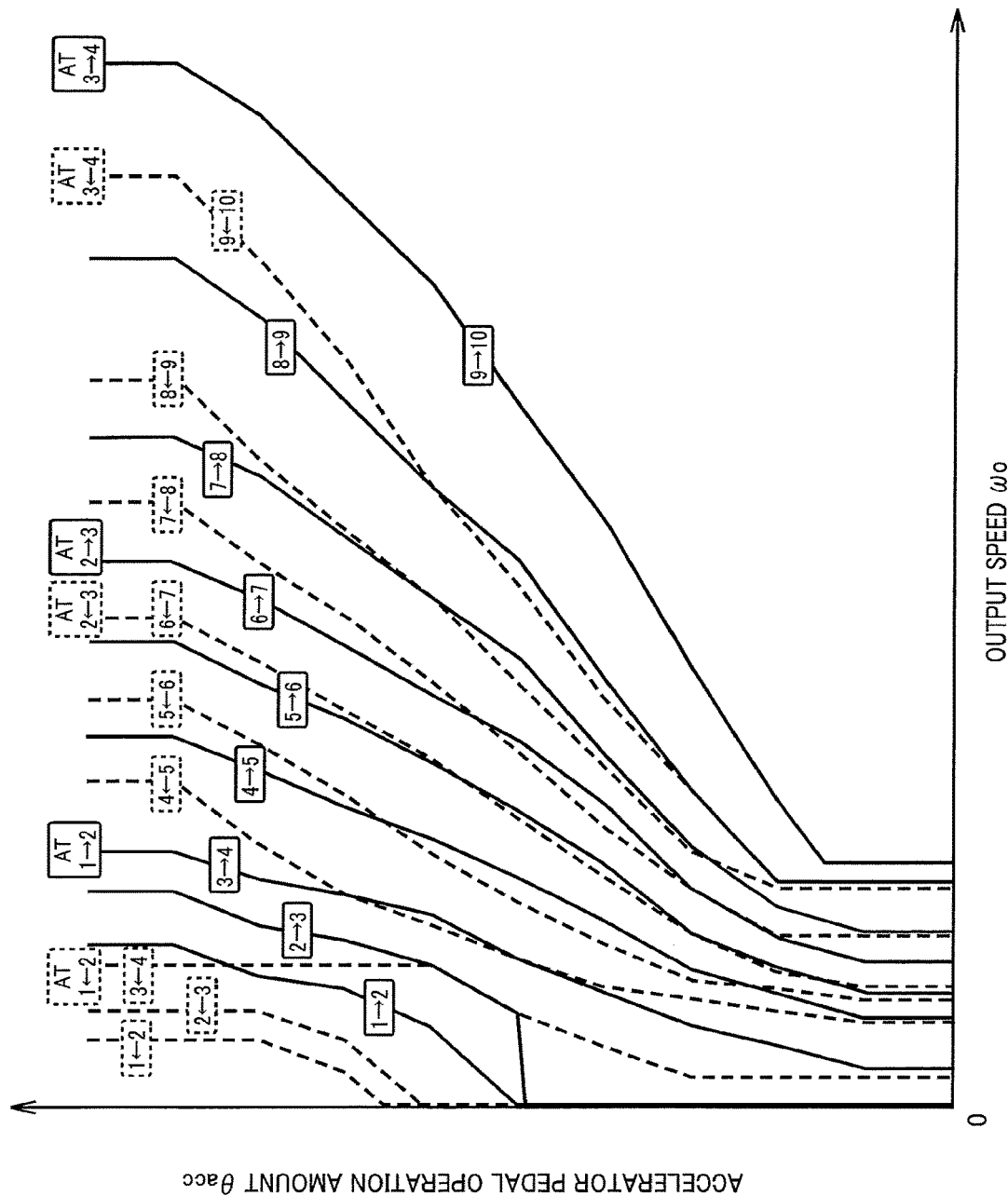
FIG. 6 is a view illustrating an example of an overall speed position shifting map used to shift up and down the transmission device from each of the overall speed positions to the adjacent position or positions.

Like the AT gear position shifting map, the above-indicated overall speed position shifting map is a relationship between the output speed ωo and the accelerator pedal operation amount θacc as parameters. FIG. 6 is the view illustrating an example of the overall speed position shifting map. In FIG. 6, solid lines indicate shift-up boundary lines while broken lines indicate shift-down boundary lines. The transmission device 40 consisting of the continuously variable transmission portion 18 and the step-variable transmission portion 20 which are disposed in series with each other is shifted from one of the overall speed positions to another according to the overall speed position shifting map, as if the transmission device 40 was shifted like a step-variable transmission as a whole. This overall step-variable shifting control to control the shifting actions of the transmission device 40 as the step-variable transmission as a whole may be implemented preferentially to the continuously variable shifting control of the transmission device 40 as the continuously variable transmission as a whole, only when a sporty drive mode or any other high-drivability drive mode is selected by the vehicle operator, or only when the required drive torque Tdem is comparatively large, but may be principally implemented except where the overall step-variable shifting control is restricted or inhibited.

The overall step-variable shifting control by the hybrid control portion 84 and the shifting control of the step-variable transmission portion 20 by the transmission shifting control portion 82 are implemented in cooperation with each other. In this embodiment, the first through tenth overall speed positions are established for the first through fourth speed AT gear positions. When the transmission device 40 is shifted between the fourth overall speed position and the third overall speed position, for example, the step-variable transmission portion 20 is shifted between the second speed AT gear position and the first speed AT gear position. When the transmission device 40 is shifted between the seventh overall speed position and the sixth overall speed position, the step-variable transmission portion 20 is shifted between the third speed AT gear position and the second speed AT gear position. When the transmission device 40 is shifted between the tenth overall speed position and the ninth overall speed position, the step-variable transmission portion 20 is shifted between the fourth speed AT gear position and the third speed AT gear position. Therefore, the AT gear position shifting map is formulated so that the AT gear position shifting operation is performed in synchronization with the overall speed position shifting operation. Described more specifically by reference to FIG. 6, shift-up boundary lines for respectively shifting the transmission device 40 from the third overall speed position to the fourth overall speed position, from the sixth overall speed position to the seventh overall speed position, and from the ninth overall speed position to the tenth overall speed position coincide with shift-up boundary lines for respectively shifting the step-variable transmission portion 20 from the first speed AT gear position to the second speed AT gear position (indicated as "AT1→2" in FIG. 6), from the second speed AT gear position to the third speed AT gear position, and from the third speed AT gear position to the fourth speed AT gear position. Similarly, shift-down boundary lines for respectively shifting the transmission device 40 from the fourth overall speed position to the third overall speed position, from the seventh overall speed position to the sixth overall speed position, and from the tenth overall speed position to the ninth overall speed position coincide with shift-down boundary lines for respectively shifting the step-variable transmission portion 20 from the second speed AT gear position to the first speed AT gear position (indicated as "AT1←2" in FIG. 6), from the third speed AT gear position to the second speed AT gear position, and from the fourth speed AT gear position to the third speed AT gear position. Alternatively, a command to shift the step-variable transmission portion 20 may be applied to the transmission shifting control portion 82 in response to a determination according to the overall speed position shifting map of FIG. 6 that the transmission device 40 should be shifted from one overall speed position to another. Thus, a shift-up action of the transmission device 40 as a whole takes place upon a shift-up action of the step-variable transmission portion 20, and a shift-down action of the transmission device 40 as a whole takes place upon a shift-down action of the step-variable transmission portion 20. The transmission shifting control portion 82 commands the step-variable transmission portion 20 to perform a shifting action from one AT gear position to another, for shifting the transmission device 40 from one overall speed position to another. Since the AT gear position shifting operation is performed in synchronization with the overall speed position shifting operation, the shifting action of the step-variable transmission portion 20 is performed with a change of the engine speed ωe, so that the vehicle operator is less likely to uncomfortably recognize a shifting shock of the step-variable transmission portion 20.

The hybrid control portion 84 selectively establishes the motor drive mode or the hybrid drive mode, depending upon a running state of the vehicle 10. For example, the hybrid control portion 84 selects the motor drive mode when the required vehicle drive power Pdem is lower than a predetermined threshold value, that is, within a predetermined motor drive mode range, and selects the hybrid drive mode when the required vehicle drive power Pdem is equal to or higher than the threshold value, that is, within a predetermined hybrid drive mode range. Further, even when the required vehicle drive power Pdem is within the motor drive mode range, the hybrid control portion 84 selects the hybrid drive mode if the electric power amount SOC stored in the battery 52 is smaller than a predetermined threshold value.

Then, the overall step-variable shifting control of the transmission device 40 involving a shifting action of the step-variable transmission portion 20 will be described in detail. The hybrid control portion 84 provides a shifting-time basic control in which the MG1 torque Tg and the MG2 torque Tm are controlled during a shifting action of the step-variable transmission portion 20 under the control of the transmission shifting control portion 82 (more specifically, in the process of engaging and releasing actions of the relevant two coupling devices CB in an inertia phase of the shifting action), on the basis of the engine torque Te and the CB-transmitted torque Tcb of one of the two coupling devices CB to be respectively brought into its engaged and released states to permit the step-variable transmission portion 20 to perform the shifting action, wherein the one of the two coupling devices CB is an initiative coupling device, which causes the shifting action to progress, and CB-transmitted torque Tcb of which is controlled to progressively implement the shifting action, and such that an MG2 angular acceleration value dωm/dt of the second motor/generator MG2 representing the rotating state of the input rotary member of the step-variable transmission portion 20, and an engine angular acceleration value dωe/dt of the engine 14 representing the operating state of the engine 14 coincide with respective predetermined target values. By controlling the MG1 torque Tg and the MG2 torque Tm, the input torque Ti of the step-variable transmission portion 20 can be controlled since a sum of the MG2 torque and the directly transmitted engine torque Td applied to the ring gear R0 due to the reaction torque by the MG1 torque Tg that acts against the engine torque Te is equal to the input torque Ti of the step-variable transmission portion 20.

The shifting control of the step-variable transmission portion 20 is performed in various shifting modes such as a power-on shift-up mode, a power-off shift-up mode, a power-on shift-down mode and a power-off shift-down mode. For instance, the shifting controls in the power-on shifting modes are implemented when the accelerator pedal operation amount θacc is increased or when the vehicle running speed V is raised while the accelerator pedal is kept in an operated position, and the shifting controls in the power-off shifting modes are implemented when the accelerator pedal operation amount θacc is reduced or when the vehicle running speed V is lowered while the accelerator pedal is kept in its non-operated or fully released position. If none of the two coupling devices to be respectively brought into the released and engaged states is given the CB-transmitted torque Tcb, the AT input speed ωi is naturally raised to a predetermined optimum value in the power-on shifting modes, and is naturally lowered to a predetermined optimum value in the power-off shifting modes.

Accordingly, the shifting action is preferably initiated by increasing the CB-transmitted torque Tcb of the coupling device CB which is to be brought into the engaged state for the shifting action, in the power-on shift-up and power-off shift-down modes in which the AT input speed ωi is not naturally changed to a predetermined synchronizing speed ωisyca (=ωo*speed ratio γata to be established after completion of the shifting action) if none of the two coupling devices to be respectively brought into the released and engaged states is given the CB-transmitted torque Tcb. On the other hand, the shifting action is preferably initiated by reducing the CB-transmitted torque Tcb of the coupling device CB which has been placed in the engaged state before the shifting action and which is to be brought into the released state for the shifting action, in the power-off shift-up and power-on shift-down modes in which the AT input speed ωi is naturally changed to the predetermined synchronizing speed ωisyca even if none of the two coupling devices to be respectively brought into the released and engaged states is given the CB-transmitted torque Tcb. Thus, the coupling device CB to be brought into the engaged state in the power-on shift-up and power-off shift-down modes is the initiative coupling device the CB-transmitted torque Tcb of which is controlled to progressively implement the shifting action, while the coupling device CB to be brought into the released state in the power-off shift-up and power-on shift-down modes is the initiative coupling device the CB-transmitted torque Tcb of which is controlled to progressively implement the shifting action.

Described more specifically, the hybrid control portion 84 is configured to calculate the MG1 torque Tg and the MG2 torque Tm according to the following mathematical equation (1), and on the basis of the target values of the MG2 angular acceleration value dωm/dt and the engine angular acceleration value dωe/dt, the engine torque Te, and an AT-transmitted torque Tat. The hybrid control portion 84 is configured to apply the motor/generator control command signals Smg to the inverter 50, so as to obtain the calculated MG1 torque Tg and MG2 torque Tm. For example, the mathematical equation (1) is derived from kinetic equations and a relationship equation. Each of the kinetic equations is established for a corresponding one of the "g", "e" and "m" axes of the continuously variable transmission portion 18 (indicated in FIG. 3), and is represented by an inertia value, an angular acceleration value and a torque value on the corresponding axis. The relationship equation is formulated in view of the continuously variable transmission portion 18 which has two degrees of freedom, (namely, in view of a fact that if the rotating speeds taken along two of the above-indicated three axes are determined, the rotating speed taken along the other axis is determined). Accordingly, values a11, . . . , b11, . . . , c22 in 2*2 matrices in the mathematical equation (1) represent combinations of parameters such as the inertia values of the rotary members of the continuously variable transmission portion 18, and the gear ratio ρ0 of the differential mechanism 32.

MathematicalEquation $$\begin{bmatrix} a_{11} & a_{12} \\ a_{21} & a_{22} \end{bmatrix} \begin{bmatrix} \dot{\omega}_m \\ \dot{\omega}_e \end{bmatrix} = \begin{bmatrix} b_{11} & b_{12} \\ b_{21} & b_{22} \end{bmatrix} \begin{bmatrix} T_m \\ T_g \end{bmatrix} + \begin{bmatrix} c_{11} & c_{12} \\ c_{21} & c_{22} \end{bmatrix} \begin{bmatrix} T_e \\ T_{at} \end{bmatrix} \quad (1)$$

For example, the target values of the MG2 angular acceleration value dωm/dt and the engine angular acceleration value dωe/dt in the mathematical equation (1) indicated above are predetermined, and depending upon the presently established one of the shifting modes of the step-variable transmission portion 20, the specific shifting action of the step-variable transmission portion 20 to be performed between the AT gear positions, and the specific shifting action of the transmission device 40 to be performed between the overall speed positions, namely, depending upon which one of the shifting modes (such as the above-described power-on shift-up mode, power-off shift-up mode, power-on shift-down mode and power-off shift-down mode) is to be performed in the step-variable transmission portion 20, between which AT speed positions the shifting action is to be performed in the step-variable transmission portion 20, and between which overall speed positions the shifting action is to be performed in the transmission device 40. The engine torque Te in the mathematical equation (1) is a required engine torque Tedem at the engine speed ωe at which the engine power Pe for obtaining the required vehicle drive power Pdem (i.e. required engine power Pedem) is obtained.

The AT-transmitted torque Tat in the mathematical equation (1) is a sum of the torque values of the intermediate power transmitting member 30 (the rotating speed of which is taken along the "m" axis) which are obtained by conversion from the CB-transmitted torques Tcb transmitted through the respective two coupling devices CB during the relevant shifting action of the step-variable transmission portion 20, namely, the torque value of the intermediate power transmitting member 30 obtained by conversion from the torque transmitted through the step-variable transmission portion 20. The mathematical equation (1) is an equation for a theoretical model of the shifting action of the step-variable transmission portion 20. In this respect, the CB-transmitted torque Tcb of the initiative coupling device CB which is controlled to progressively implement the shifting action is used as the AT-transmitted torque Tat in the mathematical equation (1). The CB-transmitted torque Tcb used as the AT-transmitted torque Tat in the mathematical equation (1) is a feed-forward value. To determine the desired CB-transmitted torque Tcb, the electronic control device 80 sets the CB-transmitted torque Tcb of the initiative coupling device CB. Specifically, the electronic control device 80 sets the CB-transmitted torque Tcb of the initiative coupling device CB corresponding to the AT input torque Ti based on the required engine power Pedem achieving the required vehicle drive power Pdem, and according to an appropriate one of a plurality of predetermined relationships between the CB-transmitted torque Tcb and the required input torque, which are formulated to ensure a good balance between the shifting shock and the required shifting time of the step-variable transmission portion 20 and which correspond to respective different combinations of the presently established shifting mode and the specific shifting action of the step-variable transmission portion 20 to be performed between the AT gear positions.

Figure 7:
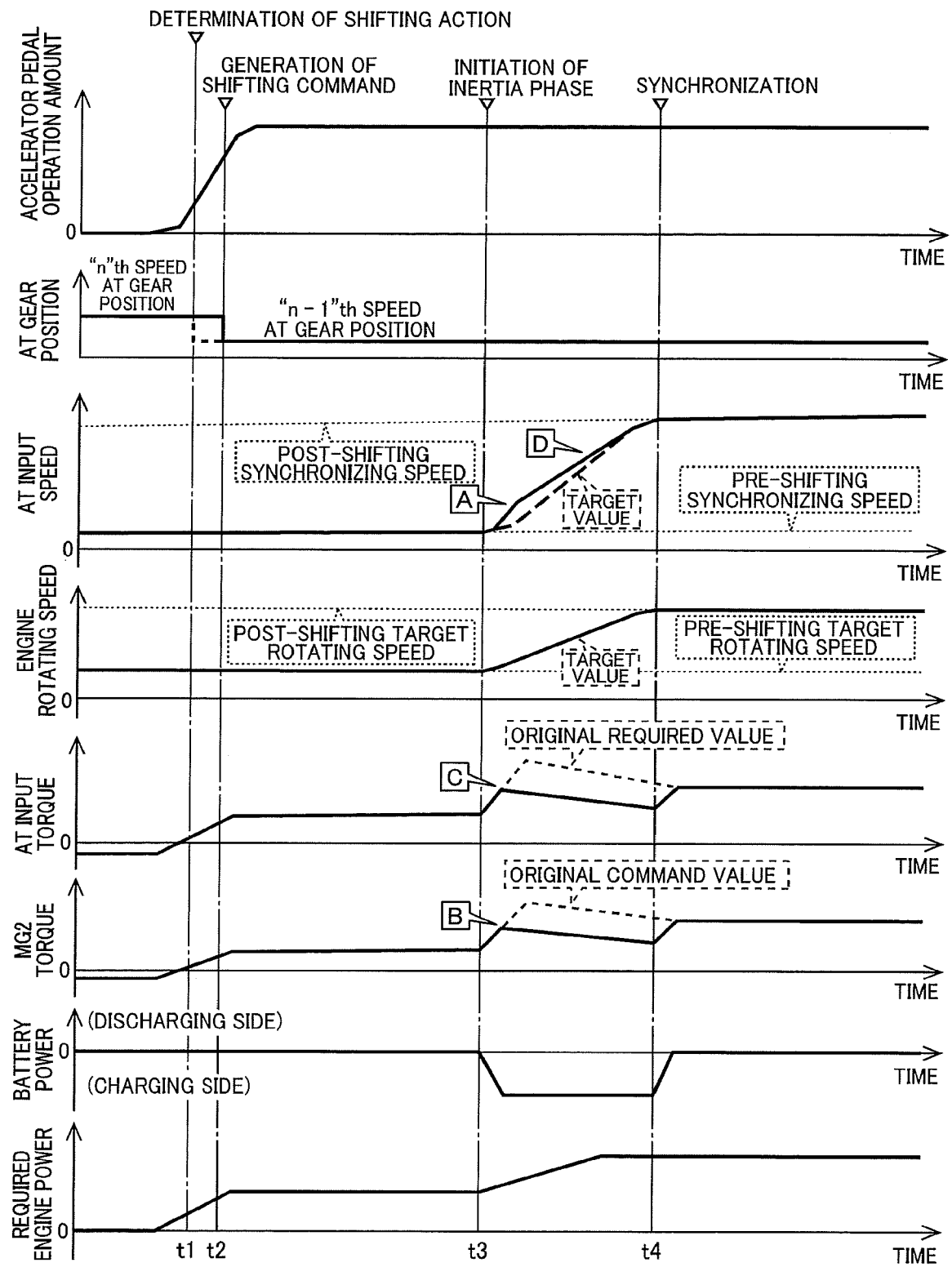
FIG. 7 is a time chart for explaining a normal power-on shift-down control of the step-variable transmission portion.

FIG. 7 is a diagram of an example of a time chart for explaining a normal power-on shift-down control of the step-variable transmission portion 20. In FIG. 7, time t1 indicates a moment of determination of the power-on shift-down action (see a broken line of AT gear position). Time t2 indicates a moment of the start of shifting output of the power-on shift-down action (see a solid line of AT gear position). After the shifting output is started, the AT input rotating speed ωi has started increasing toward a post-downshifting synchronizing rotating speed ωisyca so that an inertia phase of the power-on shift-down action is started (see time t3), and the shifting action is allowed to progress.

Subsequently, the AT input rotating speed ωi is placed into a state of being substantially synchronized with the post-downshifting synchronizing rotating speed ωisyca (see time t4). A broken line of AT input speed from time t3 to time t4 indicates a target value of the AT input rotating speed ωi when the shifting action progresses such that the MG2 angular acceleration value dωm/dt is made equal to the target value thereof. If a transmitted torque Tcb of the initiative coupling device becomes insufficient for the AT input torque Ti for some reason during the power-on shift-down action of the step-variable transmission portion 20, the MG2 angular acceleration value dωm/dt becomes larger than the target value thereof (i.e., the actual AT input rotating speed ωi rises faster than the target (see a solid line in a portion A)). In such a case, in the control (feedback control) using the mathematical equation (1), the MG2 torque Tm is reduced (see a solid line in a portion B) lower than a command value of the original MG2 torque Tm (see a broken line in the portion B) when the MG2 angular acceleration value dωm/dt is made equal to the target value thereof so that the MG2 angular acceleration value dωm/dt coincides with the target value thereof (i.e., so that the AT input rotating speed ωi coincides with the target value thereof), and the AT input torque Ti is reduced (see a solid line in a portion C) lower than a required value of the original AT input torque Ti (also referred to as a required input torque) (see a broken line in the portion C). This required input torque is, for example, a value acquired by converting the required drive torque Tdem into a torque value of the intermediate power transmitting member 30. As a result, the transmitted torque Tcb of the initiative coupling device and the AT input torque Ti are balanced and control can be provided such that the AT input rotating speed ωi coincides with the target value thereof (see a solid line in a portion D). In this case, the power corresponding to a reduction amount of the MG2 torque Tm (i.e., a reduction amount of the AT input torque Ti) is stored as electric power into the battery 52 (see time t3 to time t4).

If a chargeable electric power Win of the battery 52 is insufficient for the power corresponding to a reduction amount of the MG2 torque Tm described above (i.e., the charging of the battery 52 is limited), the MG2 torque Tm cannot sufficiently be reduced such that the AT input rotating speed ωi coincides with the target value thereof.

Figure 10:
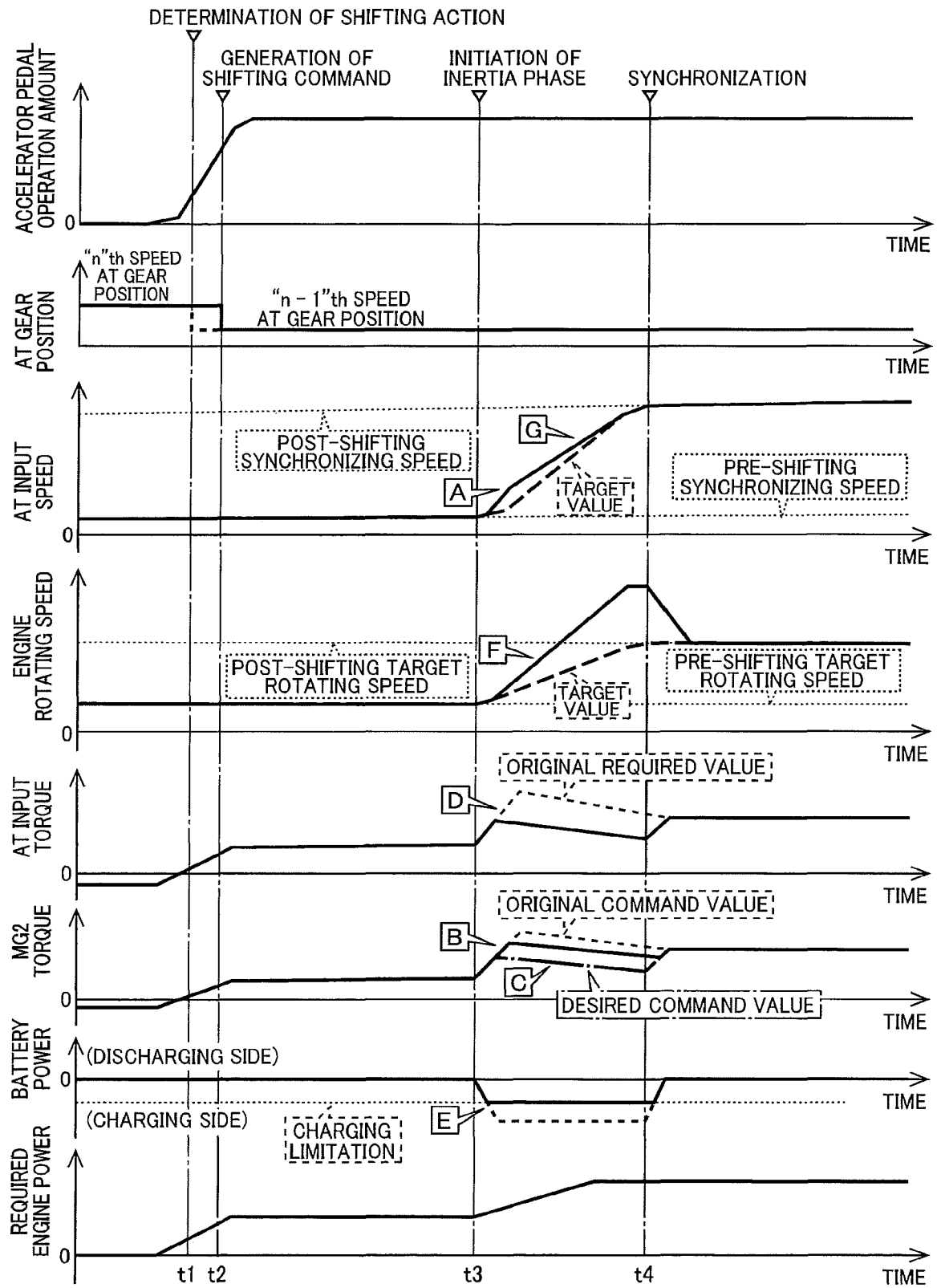
FIG. 10 is a time chart for explaining control when the charging of a battery is limited during the power-on shift-down action of the step-variable shifting portion (a comparative example)

FIG. 10 is a diagram of an example of a time chart for explaining control when the charging of the battery 52 is limited during the power-on shift-down action of the step-variable transmission portion 20 (a comparative example different from this embodiment described later). In FIG. 10, time t1 indicates a moment of determination of the power-on shift-down action (see a broken line of AT gear position). Time t2 indicates a moment of the start of shifting output of the power-on shift-down action (see a solid line of AT gear position). Time t3 indicates a moment of the start of an inertia phase of the power-on shift-down action. Time t4 indicates a moment when the AT input rotating speed ωi is substantially synchronized with the post-downshifting synchronizing rotating speed ωisyca. When the transmitted torque Tcb of the initiative coupling device becomes insufficient for the AT input torque Ti for some reason during the power-on shift-down action of the step-variable transmission portion 20 so that the actual AT input rotating speed ωi rises faster than the target (see a solid line in a portion A), as shown in FIG. 7, if a command can be given so as to sufficiently reduce the MG2 torque Tm (see a dashed-dotted line in a portion C) lower than the original command value of the MG2 torque Tm (see a broken line in a portion B), the AT input torque Ti is reduced (see a solid line in a portion D) lower than the original required value of the AT input torque Ti (see a broken line in the portion D), and the control is provided such that the AT input rotating speed ωi coincides with the target value thereof (see a solid line in a portion G). In this case, if the chargeable electric power Win of the battery 52 is small and the charging of the battery 52 is limited (see a portion E), the MG2 torque Tm cannot sufficiently be reduced (see a solid line in a portion B). In such a case, for example, the engine rotating speed ωe is increased (see a solid line in a portion F) by using the first motor/generator MG1 higher than the target value (see a broken line) of the engine rotating speed ωe when the shifting action progresses such that the engine angular acceleration value dωe/dt is made equal to the target value thereof, so as to consume as an inertia power a surplus power corresponding to a torque that cannot be reduced by reducing the MG2 torque Tm with respect to an amount of the AT input torque Ti required to be reduced (i.e., the surplus power corresponding to an amount of electric power that cannot be stored in the battery 52). As a result, the AT input torque Ti can be reduced as much as necessary (see a solid line in a portion D) so as to provide control such that the AT input rotating speed ωi coincides with the target value thereof (see a solid line in a portion G). However, the overspeeding of the engine 14 may occur, possibly resulting in deterioration in component durability or giving a strange feeling to a driver.

Therefore, if the engine rotating speed ωe possibly exceeds a predetermined rotating speed ωef during the power-on shift-down action of the step-variable transmission portion 20, the electronic control device 80 preliminarily limits the required engine power Pedem (in this case, the required engine torque Tedem has the same meaning). As a result, even when the charging of the battery 52 is limited during the power-on shift-down action of the step-variable transmission portion 20, the AT input torque Ti can be reduced as much as necessary while preventing the overspeeding of the engine 14.

Specifically, the electronic control device 80 further includes a vehicle state determining means, i.e., a vehicle state determining portion 86, a racing determining means, i.e., a racing determining portion 88, and an output limiting means, i.e., an output limiting portion 90 so as to implement the control function of preliminarily limiting the required engine power Pedem described above.

The vehicle state determining portion 86 determines whether the power-on shift-down action of the step-variable transmission portion 20 is in process when the vehicle 10 is running, for example, based on the hydraulic control command signal Sat. The vehicle state determining portion 86 determines whether the inertia phase has started during shifting transition of the power-on shift-down action of the step-variable transmission portion 20, for example, based on whether the AT input rotating speed ωi has started increasing toward the post-downshifting synchronizing rotating speed ωisyca. The vehicle state determining portion 86 determines whether the power-on shift-down action of the step-variable transmission portion 20 is completed, for example, based on the hydraulic control command signal Sat.

If the vehicle state determining portion 86 determines that the power-on shift-down action of the step-variable transmission portion 20 is in process (i.e., during the power-on shift-down action of the step-variable transmission portion 20), the racing determining portion 88 determines whether the engine rotating speed ωe is predicted to exceed, the predetermined rotating speed ωef when the hybrid control portion 84 provides control such that the MG2 angular acceleration value dωm/dt coincides with the target value thereof. In other words, the racing determining portion 88 determines whether the racing (temporary increase) of the engine rotating speed ωe as indicated by the solid line in the portion F of FIG. 10 is predicted during the power-on shift-down action of the step-variable transmission portion 20 (from another viewpoint, during the shift-down action of the transmission device 40 accompanied by the power-on shift-down action of the step-variable transmission portion 20).

It is considered that if the engine rotating speed ωe temporarily races up exceeding a post-downshifting synchronizing rotating speed ωesyca (=ωo*post-shifting speed ratio γta of the transmission device 40) during transition of a shift-down action of the transmission device 40, the engine rotating speed ωe decreases toward the completion of the shift-down action, which is likely to give a strange feeling to the driver. It is also considered that if the engine rotating speed ωe races up exceeding the post-downshifting synchronizing rotating speed ωesyca, the overspeeding of the engine 14 is likely to occur. Therefore, it is appropriate to set the predetermined rotating speed ωef to the synchronizing rotating speed ωesyca of the engine rotating speed ωe after the power-on shift-down action of the step-variable transmission portion 20.

As described above, it is considered that when the charging of the battery 52 is limited, the racing of the engine rotating speed ωe is likely to occur (see the comparative example of FIG. 10). It is considered that when the chargeable electric power Win of the battery 52 is smaller, the racing of the engine rotating speed ωe is more likely to occur. It is considered that when a change amount Δωe of the engine rotating speed ωe before and after the power-on shift-down action of the step-variable transmission portion 20 (=post-downshifting synchronizing rotating speed ωesyca−pre-downshifting synchronizing rotating speed ωesycb (=ω*pre-shifting speed ratio γtb of the transmission device 40)) is smaller, the racing of the engine rotating speed ωe is more likely to occur. If the output rotating speed ω (the vehicle speed V has the same meaning) is low, the change amount Δωe of the engine rotating speed ωe is reduced. Therefore, the racing determining portion 88 determines whether the engine rotating speed ωe is predicted to exceed the predetermined rotating speed ωef based on at least one parameter out of the chargeable electric power Win of the battery 52 as a state of limitation of the battery power Pbat limiting the MG2 torque Tm used as the basis of the AT input torque Ti, the change amount Δωe of the engine rotating speed ωe during the power-on shift-down action of the step-variable transmission portion 20, and the output rotating speed ω (or the vehicle speed V).

More preferably, the racing determining portion 88 has (i.e., stores) a relationship (prediction map) in which a state of the engine rotating speed ωe predicted to exceed the predetermined rotating speed ωef is defined in advance by using as a parameter at least one of the chargeable electric power Win of the battery 52, the change amount Δωe of the engine rotating speed ωe during the power-on shift-down action of the step-variable transmission portion 20, and the output rotating speed ωo (or the vehicle speed V). The racing determining portion 88 determines whether the engine rotating speed ωe is predicted to exceed the predetermined rotating speed ωef based on the at least one parameter by using the prediction map. A change amount Δγt (=γta−γtb) of the speed ratio γt of the transmission device 40 before and after a shift-down action differs depending on the AT gear positions between which the power-on shift-down action is performed (i.e., the overall speed positions between which the shift-down action is performed). If the change amount Δγt of the speed ratio γt of the transmission device 40 is different, the change amount Δωe of the engine rotating speed ωe is also different. Therefore, the prediction map may be defined in advance for each kind of shifting actions different in terms of the AT gear positions between which the power-on shift-down action is performed.

In this embodiment, the required engine power Pedem is limited preliminarily (in advance) before the occurrence of racing of the engine rotating speed ωe, rather than after the occurrence of racing of the engine rotating speed ωe, so as not to cause the racing of the engine rotating speed ωe. A period having a possibility of occurrence of the racing of the engine rotating speed ωe (from another viewpoint, a period having a possibility of shortage of the transmitted torque Tcb of the initiative coupling device for the AT input torque Ti) is a shift transition period after the start of the inertia phase. Therefore, it is desirable to predict the racing of the engine rotating speed ωe at least before the start of the inertia phase. Thus, the racing determining portion 88 determines whether the engine rotating speed ωe is predicted to exceed the predetermined rotating speed ωef before the start of change in the AT input rotating speed ωi due to the power-on shift-down action of the step-variable transmission portion 20 (i.e., before the start of the inertia phase). Preferably, the racing determining portion 88 determines whether the engine rotating speed ωe is predicted to exceed the predetermined rotating speed ωef from initiation of the power-on shift-down action of the step-variable transmission portion 20.

If the racing determining portion 88 determines that the engine rotating speed ωe is not predicted to exceed the predetermined rotating speed ωef during the power-on shift-down action of the step-variable transmission portion 20, the hybrid control portion 84 provides a normal-time control in which the shifting-time basic control is provided without limitation of the required engine power Pedem.

If the racing determining portion 88 determines that the engine rotating speed ωe is predicted to exceed the predetermined rotating speed ωef during the power-on shift-down action of the step-variable transmission portion 20, the output limiting portion 90 outputs to the hybrid control portion 84 a command to limit the engine power Pe to a predetermined power amount Pef or less (i.e., to limit the engine torque Te to a predetermined torque amount Tef or less). During the power-on shift-down action of the step-variable transmission portion 20, the hybrid control portion 84 provides the shifting-time basic control with the required engine power Pedem limited, based on the command from the output limiting portion 90.

The predetermined power Pef is the upper limit engine power Pe allowable during the power-on shift-down action of the step-variable transmission portion 20 and is a limit value (upper limit value) of the required engine power Pedem for preventing the engine rotating speed ωe from exceeding the predetermined rotating speed ωef. The predetermined torque Tef is the upper limit engine torque Te allowable during the power-on shift-down action of the step-variable transmission portion 20 and is a limit value of the required engine torque Tedem for preventing the engine rotating speed ωe from exceeding the predetermined rotating speed ωef.

As described above, at least one parameter out of the chargeable electric power Win of the battery 52, the change amount Δωe of the engine rotating speed ωe during the power-on shift-down action of the step-variable transmission portion 20, and the output rotating speed ω (or the vehicle speed V) relates to likelihood of occurrence of the racing of the engine rotating speed ωe. Therefore, the output limiting portion 90 sets the predetermined power Pef (i.e., sets the predetermined torque Tef) based on at least one parameter out of the chargeable electric power Win of the battery 52, the change amount Δωe of the engine rotating speed ωe during the power-on shift-down action of the step-variable transmission portion 20, and the output rotating speed ω (or the vehicle speed V). The predetermined power Pef (or the predetermined torque Tef) may be set based on the at least one parameter, for example, at the initiation of the power-on shift-down action of the step-variable transmission portion 20 (or at a moment of determination when the racing determining portion 88 determines that the engine rotating speed ωe is predicted to exceed the predetermined rotating speed ωef), and may be used as a uniform value over the power-on shift-down action. Alternatively, the predetermined power Pef (or the predetermined torque Tef) may be set based on the at least one parameter during the power-on shift-down action of the step-variable transmission portion 20 and may be variable during the power-on shift-down action.

More preferably, the output limiting portion 90 has (i.e., stores) a relationship (limit value map) in which the upper limit value is defined in advance for the engine power Pe (the engine torque Te in the case of setting the predetermined torque Tef) for preventing the engine rotating speed ωe from exceeding the predetermined rotating speed ωef, by using as a parameter at least one of the chargeable electric power Win of the battery 52, the change amount Δωe of the engine rotating speed ωe during the power-on shift-down action of the step-variable transmission portion 20, and the output rotating speed ω (or the vehicle speed V). The output limiting portion 90 sets the predetermined power Pef (i.e., sets the predetermined torque Tef) based on the at least one parameter by using the limit value map. Similar to the prediction map, the limit value map may be defined in advance for each kind of shifting actions different in terms of the AT gear positions between which the power-on shift-down action is performed.

The limitation of the required engine power Pedem may be placed from the moment of determination when the racing determining portion 88 determines that the engine rotating speed ωe is predicted to exceed the predetermined rotating speed ωef, or may be placed at least in the period having a possibility of occurrence of the racing of the engine rotating speed ωe (i.e., the shift transition period after the start of the inertia phase), for example. Therefore, the output limiting portion 90 initiates the limitation of the engine power Pe (i.e., the limitation of the engine torque Te), for example, at the start of change in the AT input rotating speed ωi due to the power-on shift-down action of the step-variable transmission portion 20 (i.e., initiates the limitation if the vehicle state determining portion 86 determines that the inertia phase has started during shifting transition of the power-on shift-down action of the step-variable transmission portion 20).

The limitation of the required engine power Pedem is preferably continued until a moment of termination of the inertia phase (i.e., until a moment of completion of the power-on shift-down action when the AT input rotating speed ωi is synchronized with the post-downshifting synchronizing rotating speed ωisyca). Therefore, the output limiting portion 90 terminates the limitation of the engine power Pe (i.e., the limitation of the engine torque Te) if the vehicle state determining portion 86 determines that the power-on shift-down action of the step-variable transmission portion 20 is completed. Alternatively, the limitation of the required engine power Pedem may be continued until the possibility of occurrence of the racing of the engine rotating speed ωe becomes lower. Therefore, the output limiting portion 90 terminates the limitation of the engine power Pe (i.e., the limitation of the engine torque Te), for example, when the power-on shift-down action of the step-variable transmission portion 20 is completed, or when a progress degree Rpro of the power-on shift-down action has reached a predetermined progress degree Rprof, or when a predetermined time TMdsf has elapsed from the start of the control of the power-on shift-down action, or when a second predetermined time TMinaf has elapsed from the start of change in the AT input rotating speed ωi due to the power-on shift-down action (i.e., the start of the inertia phase). The progress degree Rpro of the power-on shift-down action is a degree indicating how much the power-on shift-down action has progressed and, for example, the progress degree Rpro is implemented by using a differential rotating speed Δωi (=ωisyca−ωi) between the actual AT input rotating speed ωi and the post-downshifting synchronizing rotating speed ωisyca, a proportion Rωi (=ωi/ωisyca) of the actual AT input rotating speed ωi to the synchronizing rotating speed ωisyca, etc. The predetermined progress degree Rprof, the predetermined time TMdsf, and the second predetermined time TMinaf are respective threshold values defined in advance so as to determine that the possibility of occurrence of the racing of the engine rotating speed ωe is low or does not exist even when the limitation of the required engine power Pedem is canceled.

Figure 8:
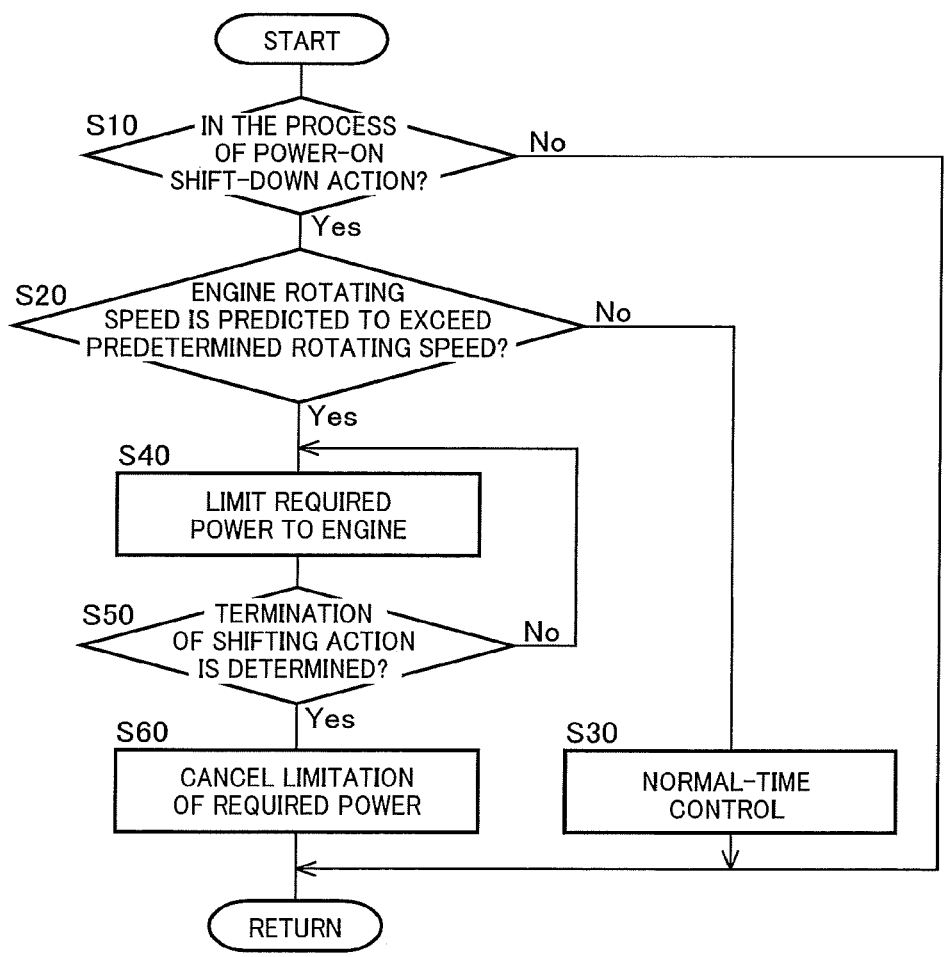
FIG. 8 is a flowchart for explaining a main portion of the control operation of an electronic control device, i.e., the control operation for preventing or suppressing deterioration in component durability or a strange feeling given to a driver due to overspeeding of the engine at the time of the power-on shift-down action of the step-variable transmission portion.
Figure 9:
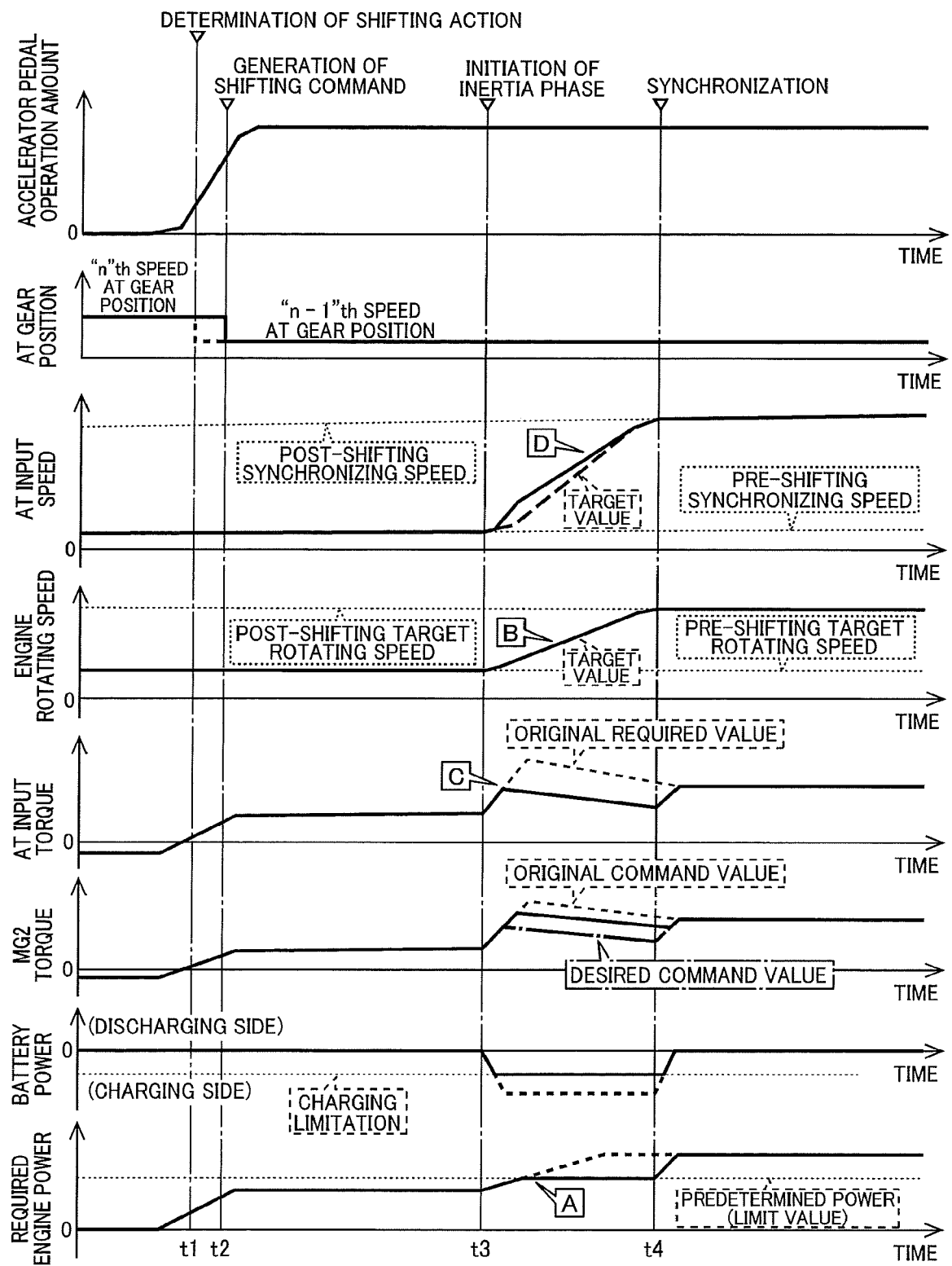
FIG. 9 is a time chart when the control operation shown in the flowchart of FIG. 8 is performed.

FIG. 8 is a flowchart for explaining a main portion of the control operation of the electronic control device 80, i.e., the control operation for preventing or suppressing deterioration in component durability or a strange feeling given to a driver due to overspeeding of the engine 14 at the time of the power-on shift-down action of the step-variable transmission portion 20, and the flowchart is repeatedly executed during running of the vehicle 10, for example. FIG. 9 is an example of a time chart when the control operation shown in the flowchart of FIG. 8 is performed.

In FIG. 8, first, at a step (hereinafter, step is omitted) S10 corresponding to the function of the vehicle state determining portion 86, it is determined whether the power-on shift-down action of the step-variable transmission portion 20 is in process. If the determination of S10 is negative, this routine is terminated. If the determination of S10 is affirmative, it is determined at S20 corresponding to the function of the racing determining portion 88 whether the engine rotating speed ωe is predicted to exceed the predetermined rotating speed ωef when control is provided such that the MG2 angular acceleration value dωm/dt coincides with the target value thereof. If the determination of S20 is negative, at S30 corresponding to the function of the hybrid control portion 84, the normal control during the power-on shift-down action of the step-variable transmission portion 20 is provided (i.e., the normal-time control in which the shifting-time basic control is provided without limitation of the required engine power Pedem) (see FIG. 7). If the determination of S20 is affirmative, at S40 corresponding to the functions of the output limiting portion 90 and the hybrid control portion 84, the engine power Pe is limited to the predetermined power Pef or less, and the shifting-time basic control is provided with the required engine power Pedem limited. Subsequently, at S50 corresponding to the function of the vehicle state determining portion 86, it is determined whether the power-on shift-down action of the step-variable transmission portion 20 is completed (terminated). If the determination of S50 is negative, S40 is executed. If the determination of S50 is affirmative, the limitation of the required engine power Pedem is terminated (canceled) at S60 corresponding to the functions of the output limiting portion 90 and the hybrid control portion 84.

In FIG. 9, time t1 indicates a moment of determination of the power-on shift-down action (see a broken line of AT gear position). Time t2 indicates a moment of the start of shifting output of the power-on shift-down action (see a solid line of AT gear position). Time t3 indicates a moment of the start of the inertia phase. Time t4 indicates a moment when the AT input rotating speed $\omega i$ is substantially synchronized with the post-downshifting synchronizing rotating speed $\omega isyca$. If the chargeable electric power Win of the battery 52 is small and the charging of the battery 52 is limited so that the MG2 torque Tm cannot sufficiently be reduced, instead of the embodiment of increasing the engine rotating speed $\omega e$ higher than the target value thereof to provide control such that the AT input rotating speed $\omega i$ consists with the target value thereof (see the embodiment shown in FIG. 10 described above), the required engine power Pedemto the engine 14 is preliminarily limited (see a portion A) so as to suppress or eliminate the surplus power corresponding to a torque that cannot be reduced by reducing the MG2 torque Tm with respect to an amount of the AT input torque Ti required to be reduced. As a result, the AT input torque Ti can be reduced as much as necessary (see a portion C) without increasing the engine rotating speed $\omega e$ (see a portion B) and control can be provided such that the AT input rotating speed $\omega i$ coincides with the target value thereof (see a solid line in a portion D).

As described above, according to the present embodiment, if the engine rotating speed $\omega e$ is predicted to exceed the predetermined rotating speed $\omega ef$ when the MG2 angular acceleration value $d\omega m/dt$ is controlled to the target value thereof during the power-on shift-down action of the step-variable transmission portion 20, the engine power Pe is controlled to the predetermined power Pef or less (i.e., the engine torque Te is controlled to the predetermined torque Tef or less), so that the power-on shift-down action can be performed without causing the overspeeding of the engine 14 in the vehicle 10 provided with the differential mechanism 32 and the step-variable transmission portion 20 in series. Therefore, a deterioration in component durability or a strange feeling given to a driver due to overspeeding of the engine 14 can be prevented or suppressed at the time of the power-on shift-down action of the step-variable transmission portion 20.

According to the present embodiment, since it is determined whether the engine rotating speed $\omega e$ is predicted to exceed the predetermined rotating speed $\omega ef$ based on at least one of the chargeable electric power Win of the battery 52, the change amount $\Delta\omega e$ of the engine rotating speed $\omega e$ during the power-on shift-down action of the step-variable transmission portion 20, and the output rotating speed $\omega o$ (or the vehicle speed V), the engine rotating speed $\omega e$ is appropriately predicted to exceed the predetermined rotating speed $\omega ef$ during the power-on shift-down action.

According to the present embodiment, since the predetermined rotating speed $\omega ef$ is the synchronizing rotating speed $\omega esyca$ of the engine rotating speed $\omega e$ after the power-on shift-down action of the step-variable transmission portion 20, it is determined whether the racing of the engine rotating speed $\omega e$ is predicted to occur such that the engine rotating speed $\omega e$ exceeds the synchronizing rotating speed $\omega esyca$ (i.e., whether the overspeeding of the engine 14 is predicted to occur).

According to the present embodiment, since the predetermined power Pef is set (i.e., the predetermined torque Tef is set) based on at least one of the chargeable electric power Win of the battery 52, the change amount $\Delta\omega e$ of the engine rotating speed $\omega e$ during the power-on shift-down action of the step-variable transmission portion 20, and the output rotating speed $\omega$ (or the vehicle speed V), the power-on shift-down action can appropriately be performed without causing the overspeeding of the engine 14.

According to the present embodiment, since the limitation of the engine power Pe (i.e., the limitation of the engine torque Te) is initiated at the start of change in the AT input rotating speed $\omega i$ due to the power-on shift-down action of the step-variable transmission portion 20, the power-on shift-down action can appropriately be performed without causing the overspeeding of the engine 14.

According to the present embodiment, the limitation of the engine power Pe (i.e., the limitation of the engine torque Te) is terminated when the power-on shift-down action of the step-variable transmission portion 20 is completed, or when the progress degree Rpro of the power-on shift-down action has reached the predetermined progress degree Rprof, or when the predetermined time TMdsf has elapsed from the start of the control of the power-on shift-down action, or when the second predetermined time TMinaf has elapsed from the start of change in the AT input rotating speed (pi due to the power-on shift-down action (i.e., the start of the inertia phase), so that the engine power Pe is limited (i.e., the engine torque Te is limited) appropriately while the possibility of occurrence of the overspeeding of the engine rotating speed $\omega e$ exists. From another viewpoint, if the possibility of occurrence of the overspeeding of the engine rotating speed $\omega e$ becomes lower, the engine power Pe is more easily output (i.e., the engine torque Te is more easily output) as requested.

While the preferred embodiment of this invention has been described in detail by reference to the drawings, it is to be understood that the invention may be otherwise embodied.

Figure 11:
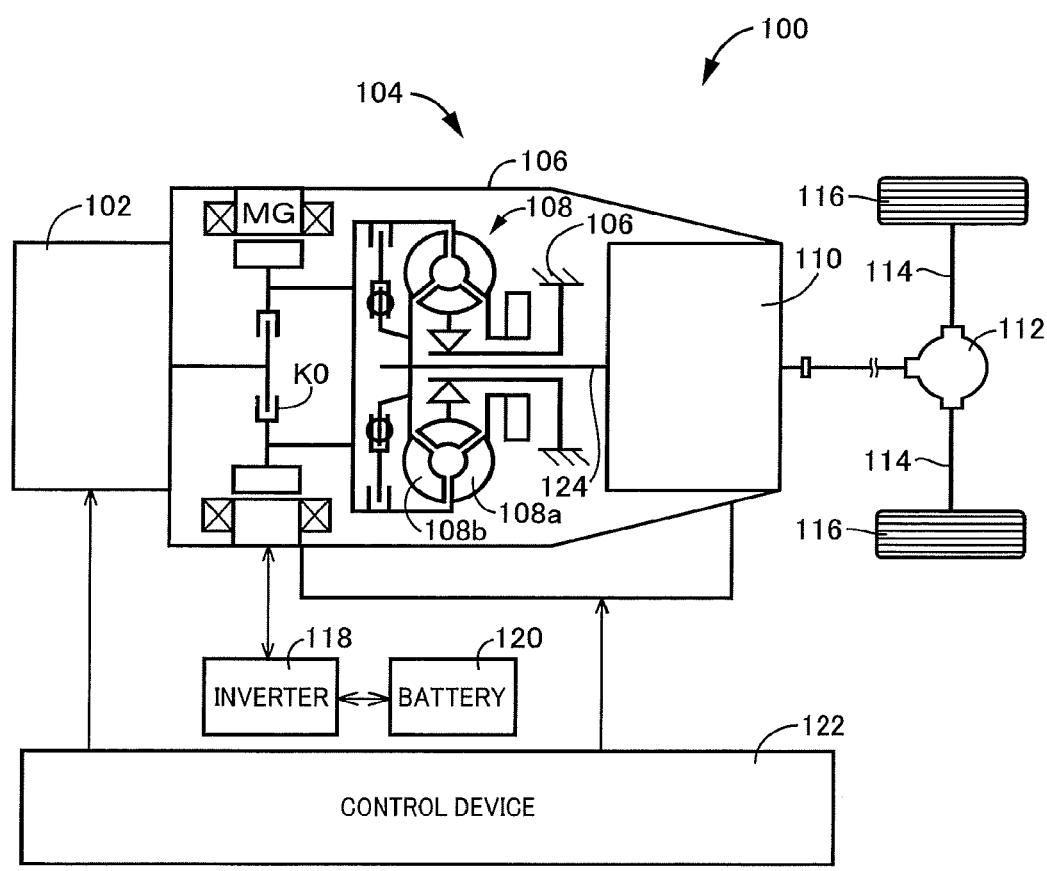
FIG. 11 is a schematic view showing an arrangement of another type of vehicular drive system different from that of FIG. 1, which is to be controlled by the control apparatus according to the present invention.

In the embodiments, the control apparatus is configured to control the vehicle 10 provided with the continuously variable transmission portion 18 and the step-variable transmission portion 20 which are disposed in series with each other. However, the control apparatus according to the present invention may be configured to control a vehicle 100 shown in FIG. 11. The vehicle 100 which is controlled by the control apparatus in the form of a control device 122 according to this embodiment is a hybrid vehicle provided with an engine 102 and a motor/generator MG functioning as the drive power source, and a power transmitting system 104. As shown in FIG. 11, the power transmitting system 104 includes a clutch K0, a torque converter 108 and a step-variable transmission 110, which are disposed within a stationary member in the form of a casing 106 fixed to a body of the vehicle 100, in this order of description as seen in the direction from the engine 102. The power transmitting system 104 further includes a differential gear device 112 and axles 114. The torque converter 108 has a pump impeller 108a selectively connected to the engine 102 through the clutch K0 and directly connected to the motor/generator MG, and a turbine impeller 108b directly connected to the step-variable transmission 110. In the power transmitting system 104, a drive force of the engine 102 and/or a drive force of the motor/generator MG are/is transmitted to drive wheels 116 of the vehicle 100 through the clutch K0 (where the drive force of the engine 102 is transmitted), the torque converter 108, the step-variable transmission 110, the differential gear device 112 and the axles 114, in this order of description. The step-variable transmission 110 is an automatic transmission which constitutes a part of a power transmitting path between the drive power source (the engine 102, the motor/generator MG) and the drive wheels 116 and in which a shifting action is performed by selective engagement of a plurality of coupling devices. The vehicle 100 includes an inverter 118, a battery 120 serving as an electric storage device giving/receiving electric power to/from the motor/generator MG via the inverter 118, and a control device 122. During the shifting action of the step-variable transmission 110, the control device 122 controls the AT input torque Ti based on the engine torque Te and the transmitted torque of the coupling devices such that a value representing a rotating state of an input shaft 124 serving as an input rotary member of the step-variable transmission 110 coincides with a target value. The value representing the rotating state of the input shaft 124 is, for example, an AT input rotating speed $\omega i$ that is a rotating speed of the input shaft 124, or an AT input angular acceleration value $d\omega i/dt$ that is an angular acceleration value of the input shaft 124, etc. In short, the present invention is applicable to any hybrid vehicle provided with an engine and a motor/generator functioning as a drive power source, an automatic transmission which constitutes a part of a power transmitting path between the drive power source and drive wheels and in which a shifting action is performed by selective engagement of a plurality of coupling devices, and an electric power storage device to and from which an electric power is respectively supplied from and to the motor/generator. While the vehicle 100 uses the torque converter 108 as a fluid-operated power transmitting device, the vehicle 100 may use other types of fluid-operated power transmitting devices such as a fluid coupling not having a torque boosting function. Further, the torque converter 108 need not be provided, or may be replaced by a device having a simple clutch function.

The manner of shifting-time basic control of the transmission device 40 (for example, the shifting control according to the mathematical equation (1)) in the illustrated embodiments is applicable to the shifting control of the step-variable transmission portion 20 while the transmission device 40 as a whole is operated as a continuously variable transmission, as well as the step-variable shifting control to shift the transmission device 40 to a selected one of the overall speed positions together with a shifting action of the step-variable transmission portion 20.

In the illustrated embodiments, the step-variable transmission portion 20 is a planetary gear type automatic transmission having the four AT gear positions for forward driving of the vehicle 10. However, the step-variable transmission portion 20 need not have the four AT gear positions, as long as the step-variable transmission portion 20 performs a shifting action by selective engagement of a plurality of coupling devices. That is, the step-variable transmission portion 20 which is the planetary gear type automatic transmission in the embodiments may be replaced by any other type of automatic transmission such as a known DCT (Dual Clutch Transmission) which is a synchronous meshing parallel two-axes type automatic transmission having two input shafts which are provided with respective coupling devices (clutches) and which are operatively connected to respective two shifting units having respective even-numbered gear positions and odd-numbered gear positions. In the DCT type automatic transmission, coupling devices each connecting to respective inputs of the two shifting units correspond to the selected ones of plurality of coupling devices of the present invention.

In the illustrated embodiments, the transmission device 40 as a whole is shifted to a selected one of the overall speed positions, like a step-variable transmission, according to the overall speed position shifting map. However, the transmission device 40 may be shifted to the selected overall speed position according to an operation of the shift lever 56, a shift-up/shift-down switch or any other member operated by the vehicle operator to shift the transmission device 40.

In the illustrated embodiments, the ten overall speed positions are established for the four AT gear positions. Although the number of the overall speed positions may be equal to the number of the AT gear positions, the number of the overall speed positions is preferably larger than the number of the AT gear positions, for instance, twice or more of the number of the AT gear positions. The numbers of the AT gear positions and the overall speed positions are suitably determined, as long as the step-variable transmission portion is shifted such that the rotating speed of the intermediate power transmitting member 30 and the operating speed of the second motor/generator MG2 connected to the intermediate power transmitting member 30 are held within respective predetermined ranges, and the transmission device 40 is shifted such that the engine speed $\omega e$ is held with a predetermined range.

In the illustrated embodiments, the differential mechanism 32 is the planetary gear set of the single-pinion type having the three rotary elements. However, the differential mechanism 32 may be replaced by a differential mechanism including a plurality of planetary gear sets which are connected to each other and which have four or more rotary elements. Alternatively, the differential mechanism 32 may be a planetary gear set of a double-pinion type, or a differential gear device including a pinion rotated by the engine 14 and a pair of bevel gears which mesh with the pinion and which are connected to the first motor/generator MG1 and the intermediate power transmitting member 30.

It is to be understood that the embodiments and modifications described above are given for illustrative purpose only, and that the present invention may be embodied with various other changes and improvements which may occur to those skilled in the art.

NOMENCLATURE OF ELEMENTS

10: Vehicle (Hybrid vehicle)
14: Engine
20: Step-variable transmission portion (Automatic transmission)
28: Drive wheels
30: Intermediate power transmitting member (Input rotary member of automatic transmission)
32: Differential mechanism
CA0: Carrier (First rotary element)
S0: Sun gear (Second rotary element)
R0: Ring gear (Third rotary element)
52: Battery (Electric storage device)
80: Electronic control device (Control apparatus)
82: Transmission shifting control portion (Shift control portion)
84: Hybrid control portion
88: Racing determining portion
90: Output limiting portion
CB: Coupling devices MG1: First motor/generator
MG2: Second motor/generator (Motor/generator)
100: Vehicle (Hybrid vehicle)
102: Engine
110: Step-variable transmission (Automatic transmission)
116: Drive wheels
120: Battery (Electric storage device)
122: Control device
124: Input shaft (Input rotary member of automatic transmission)
MG: Motor/generator

What is claimed is:

1. A control apparatus for a hybrid vehicle provided with an engine and a motor/generator functioning as a drive power source, an automatic transmission which constitutes a part of a power transmitting path between the drive power source and drive wheels and in which a shifting action is performed by selective engagement of a plurality of coupling devices, and an electric storage device giving/receiving electric power to/from the motor/generator, the control apparatus comprising:
 a hybrid control portion configured to control an input torque to the automatic transmission by the motor/generator during the shifting action of the automatic transmission on the basis of an output torque of the engine and a transmitted torque of the coupling devices, such that a value representing a rotating state of an input rotary member of the automatic transmission coincides with a target value;
 a racing determining portion configured to determine whether a rotating speed of the engine is predicted to exceed a predetermined rotating speed when control is provided such that the value representing the rotating state of the input rotary member of the automatic transmission coincides with the target value during a power-on shift-down action of the automatic transmission; and
 an output limiting portion configured to limit the output torque of the engine to a predetermined torque or less if the rotating speed of the engine is predicted to exceed the predetermined rotating speed during the power-on shift-down action of the automatic transmission.

2. The control apparatus according to claim 1, wherein the racing determining portion determining whether the rotating speed of the engine is predicted to exceed the predetermined rotating speed based on at least one of a state of limitation of power of the electric storage device limiting an output torque of the motor/generator used as the basis of the input torque to the automatic transmission, a change amount of the rotating speed of the engine during the power-on shift-down action of the automatic transmission, and a vehicle speed.

3. The control apparatus according to claim 1, wherein the predetermined rotating speed is a synchronizing rotating speed of the rotating speed of the engine after the power-on shift-down action of the automatic transmission.

4. The control apparatus according to claim 1, wherein the output limiting portion sets the predetermined torque based on at least one of a state of limitation of power of the electric storage device limiting the output torque of the motor/generator used as the basis of the input torque to the automatic transmission, a change amount of the rotating speed of the engine during the power-on shift-down action of the automatic transmission, and a vehicle speed.

5. The control apparatus according to claim 4, wherein the output limiting portion initiates limitation of the output torque of the engine at a start of change in a rotating speed of the input rotary member of the automatic transmission due to the power-on shift-down action of the automatic transmission.

6. The control apparatus according to claim 5, wherein the output limiting portion terminates limitation of the output torque of the engine when the power-on shift-down action of the automatic transmission is completed, when a progress degree of the power-on shift-down action has reached a predetermined progress degree, when a predetermined time has elapsed from start of control of the power-on shift-down action, or when a second predetermined time has elapsed from start of change in the rotating speed of the input rotary member of the automatic transmission due to the power-on shift-down action.

7. The control apparatus according to claim 4, wherein the output limiting portion terminates limitation of the output torque of the engine when the power-on shift-down action of the automatic transmission is completed, when a progress degree of the power-on shift-down action has reached a predetermined progress degree, when a predetermined time has elapsed from start of control of the power-on shift-down action, or when a second predetermined time has elapsed from start of change in a rotating speed of the input rotary member of the automatic transmission due to the power-on shift-down action.

8. The control apparatus according to claim 1, wherein the output limiting portion initiates limitation of the output torque of the engine at a start of change in a rotating speed of the input rotary member of the automatic transmission due to the power-on shift-down action of the automatic transmission.

9. The control apparatus according to claim 8, wherein the output limiting portion terminates limitation of the output torque of the engine when the power-on shift-down action of the automatic transmission is completed, when a progress degree of the power-on shift-down action has reached a predetermined progress degree, when a predetermined time has elapsed from start of control of the power-on shift-down action, or when a second predetermined time has elapsed from start of change in the rotating speed of the input rotary member of the automatic transmission due to the power-on shift-down action.

10. The control apparatus according to claim 1, wherein the output limiting portion terminates limitation of the output torque of the engine when the power-on shift-down action of the automatic transmission is completed, when a progress degree of the power-on shift-down action has reached a predetermined progress degree, when a predetermined time has elapsed from start of control of the power-on shift-down action, or when a second predetermined time has elapsed from start of change in a rotating speed of the input rotary member of the automatic transmission due to the power-on shift-down action.

11. The control apparatus according to claim 1, wherein
 the hybrid vehicle is provided with a differential mechanism comprising a first rotary element to which the engine is operatively connected, a second rotary element to which a first motor/generator is operatively connected, and a third rotary element to which an intermediate power transmitting member is connected,
 the motor/generator is a second motor/generator operatively connected to the intermediate power transmitting member,
 the automatic transmission is a step-variable transmission which constitutes a part of a power transmitting path between the intermediate power transmitting member and the drive wheels and in which each of a plurality of speed positions is formed by engagement of respectively predetermined coupling device out of the plurality of coupling devices, the electric storage device gives/receives electric power to/from each of the first motor/generator and the second motor/generator, the control apparatus further comprises a shift control portion configured to switch the speed position formed in the step-variable transmission by controlling release of a coupling device to be released out of the predetermined coupling devices forming the speed position before a shifting action and engagement of a coupling device to be engaged out of the predetermined coupling devices forming the speed position after a shifting action, and the hybrid control portion is configured to control an output torque of the first motor/generator and an output torque of the second motor/generator during a shifting action of the step-variable transmission on the basis of the output torque of the engine and a transmitted torque to be transmitted through one of the plurality of coupling devices which causes a shifting action to progress out of the coupling devices to be released and to be engaged, such that an angular acceleration value of the second motor/generator and an angular acceleration value of the engine coincide with respective target values.

12. A control apparatus for a hybrid vehicle provided with an engine and a motor/generator functioning as a drive power source, an automatic transmission which constitutes a part of a power transmitting path between the drive power source and drive wheels and in which a shifting action is performed by selective engagement of a plurality of coupling devices, and an electric storage device giving/receiving electric power to/from the motor/generator, the control apparatus comprising:

circuitry configured to:

control an input torque to the automatic transmission by the motor/generator during the shifting action of the automatic transmission on the basis of an output torque of the engine and a transmitted torque of the coupling devices, such that a value representing a rotating state of an input rotary member of the automatic transmission coincides with a target value;

determine whether a rotating speed of the engine is predicted to exceed a predetermined rotating speed when control is provided such that the value representing the rotating state of the input rotary member of the automatic transmission coincides with the target value during a power-on shift-down action of the automatic transmission; and limit the output torque of the engine to a predetermined torque or less if the rotating speed of the engine is predicted to exceed the predetermined rotating speed during the power-on shift-down action of the automatic transmission.

13. The control apparatus according to claim 12, wherein the circuitry is configured to determine whether the rotating speed of the engine is predicted to exceed the predetermined rotating speed based on at least one of a state of limitation of power of the electric storage device limiting an output torque of the motor/generator used as the basis of the input torque to the automatic transmission, a change amount of the rotating speed of the engine during the power-on shift-down action of the automatic transmission, and a vehicle speed.

14. The control apparatus according to claim 12, wherein the predetermined rotating speed is a synchronizing rotating speed of the rotating speed of the engine after the power-on shift-down action of the automatic transmission.

15. The control apparatus according to claim 12, wherein the circuitry is configured to set the predetermined torque based on at least one of a state of limitation of power of the electric storage device limiting the output torque of the motor/generator used as the basis of the input torque to the automatic transmission, a change amount of the rotating speed of the engine during the power-on shift-down action of the automatic transmission, and a vehicle speed.

16. The control apparatus according to claim 15, wherein the circuitry is configured to initiate limitation of the output torque of the engine at a start of change in a rotating speed of the input rotary member of the automatic transmission due to the power-on shift-down action of the automatic transmission.

17. The control apparatus according to claim 15, wherein the circuitry is configured to terminate limitation of the output torque of the engine when the power-on shift-down action of the automatic transmission is completed, when a progress degree of the power-on shift-down action has reached a predetermined progress degree, when a predetermined time has elapsed from start of control of the power-on shift-down action, or when a second predetermined time has elapsed from start of change in a rotating speed of the input rotary member of the automatic transmission due to the power-on shift-down action.

18. The control apparatus according to claim 12, wherein the circuitry is configured to initiate limitation of the output torque of the engine at a start of change in a rotating speed of the input rotary member of the automatic transmission due to the power-on shift-down action of the automatic transmission.

19. The control apparatus according to claim 12, wherein the circuitry is configured to terminate limitation of the output torque of the engine when the power-on shift-down action of the automatic transmission is completed, when a progress degree of the power-on shift-down action has reached a predetermined progress degree, when a predetermined time has elapsed from start of control of the power-on shift-down action, or when a second predetermined time has elapsed from start of change in a rotating speed of the input rotary member of the automatic transmission due to the power-on shift-down action.

20. The control apparatus according to claim 12, wherein the hybrid vehicle is provided with a differential mechanism comprising a first rotary element to which the engine is operatively connected, a second rotary element to which a first motor/generator is operatively connected, and a third rotary element to which an intermediate power transmitting member is connected, the motor/generator is a second motor/generator operatively connected to the intermediate power transmitting member, the automatic transmission is a step-variable transmission which constitutes a part of a power transmitting path between the intermediate power transmitting member and the drive wheels and in which each of a plurality of speed positions is formed by engagement of respectively predetermined coupling device out of the plurality of coupling devices, the electric storage device gives/receives electric power to/from each of the first motor/generator and the second motor/generator, and the circuitry is configured to:

switch the speed position formed in the step-variable transmission by controlling release of a coupling device to be released out of the predetermined coupling devices forming the speed position before a shifting action and engagement of a coupling device to be engaged out of the predetermined coupling devices forming the speed position after a shifting action; and control an output torque of the first motor/generator and an output torque of the second motor/generator during a shifting action of the step-variable transmission on the basis of the output torque of the engine and a transmitted torque to be transmitted through one of the plurality of coupling devices which causes a shifting action to progress out of the coupling devices to be released and to be engaged, such that an angular acceleration value of the second motor/generator and an angular acceleration value of the engine coincide with respective target values.

* * * * *